(12) United States Patent
Goodridge et al.

(10) Patent No.: US 11,270,013 B2
(45) Date of Patent: Mar. 8, 2022

(54) MANAGING PRIVILEGE DELEGATION ON A COMPUTER DEVICE

(71) Applicant: Avecto Limited, Manchester (GB)

(72) Inventors: John Goodridge, Cheshire (GB); Georgina Shippey, Manchester (GB)

(73) Assignee: Avecto Limited, Manchester (GB)

( * ) Notice: Subject to any disclaimer, the term of this patent is extended or adjusted under 35 U.S.C. 154(b) by 370 days.

(21) Appl. No.: 16/269,963

(22) Filed: Feb. 7, 2019

(65) Prior Publication Data

US 2019/0243985 A1    Aug. 8, 2019

(30) Foreign Application Priority Data

Feb. 8, 2018   (GB) ...................... 1802099

(51) Int. Cl.
*G06F 21/00*       (2013.01)
*G06F 21/62*       (2013.01)
(Continued)

(52) U.S. Cl.
CPC .......... *G06F 21/6218* (2013.01); *G06F 21/45* (2013.01); *G06F 21/604* (2013.01)

(58) Field of Classification Search
None
See application file for complete search history.

(56) References Cited

U.S. PATENT DOCUMENTS 5,881,225 A    3/1999   Worth
5,991,542 A   11/1999   Han et al.
(Continued)

FOREIGN PATENT DOCUMENTS

EP    2750035 A1   7/2014
GB    2486528 B    9/2016
(Continued)

OTHER PUBLICATIONS

Chris Hoffman and Justin Pot; "How to Install Applications On a Mac: Everything You Need to Know" HowToGeek.com website [full url in ref.]; Jul. 20, 2017 (Year: 2017).

(Continued)

*Primary Examiner* — Andrew J Steinle
(74) *Attorney, Agent, or Firm* — Morris, Manning & Martin, LLP; Daniel E. Sineway; Adam J. Thompson

(57) ABSTRACT

A computer device for managing privilege delegation to control creation of processes thereon is described. Creation of a process, in a user account on a computer device, is requested according to first privileges. An agent, cooperating with an operating system of the computer device, intercepts the request. The agent determines whether to create the process according to second privileges, different from the first privileges and if permitted, cause the process to be created accordingly. The agent hooks a query provided by the operating system to identify whether a user account control service is enabled. The agent enquires of the operating system whether to create the process according to the second privileges whereupon the hooked query is invoked. The agent confirms to the operating system that the user account control service is enabled, such that checks by the operating system are performed as if the operating system were enabled.

20 Claims, 9 Drawing Sheets

(51) Int. Cl.
*G06F 21/45* (2013.01)
*G06F 21/60* (2013.01)

(56) References Cited

U.S. PATENT DOCUMENTS

| | | | |
|---|---|---|---|
| 6,233,618 | B1 | 5/2001 | Shannon |
| 7,133,904 | B1 | 11/2006 | Soyha et al. |
| 7,219,354 | B1 | 5/2007 | Huang et al. |
| 8,368,640 | B2 | 2/2013 | Dardinski et al. |
| 9,158,662 | B1 | 10/2015 | Hanes et al. |
| 9,769,131 | B1 | 9/2017 | Hartley |
| 10,803,499 | B1 | 10/2020 | Davis et al. |
| 2002/0144137 | A1 | 10/2002 | Harrah et al. |
| 2002/0174256 | A1 | 11/2002 | Bonilla et al. |
| 2004/0210771 | A1 | 10/2004 | Wood et al. |
| 2005/0188370 | A1 | 8/2005 | Kouznetsov et al. |
| 2006/0089834 | A1 | 4/2006 | Mowatt et al. |
| 2007/0180502 | A1 | 8/2007 | Yadav et al. |
| 2007/0198933 | A1 | 8/2007 | Van Der Bogert et al. |
| 2008/0060051 | A1 | 3/2008 | Lim |
| 2008/0289026 | A1 | 11/2008 | Abzarian et al. |
| 2009/0070442 | A1 | 3/2009 | Kacin et al. |
| 2010/0274366 | A1 | 10/2010 | Fata et al. |
| 2011/0030045 | A1 | 2/2011 | Beauregard et al. |
| 2011/0173251 | A1 | 7/2011 | Sandhu et al. |
| 2011/0196842 | A1 | 8/2011 | Timashev et al. |
| 2011/0239288 | A1 | 9/2011 | Cross et al. |
| 2011/0251992 | A1 | 10/2011 | Bethlehem et al. |
| 2012/0047259 | A1 | 2/2012 | Krasser et al. |
| 2012/0054744 | A1 | 3/2012 | Singh et al. |
| 2012/0066512 | A1 | 3/2012 | Kass et al. |
| 2012/0226742 | A1 | 9/2012 | Mornchilov et al. |
| 2013/0057561 | A1 | 3/2013 | Nave et al. |
| 2013/0339313 | A1 | 12/2013 | Blaine et al. |
| 2014/0279600 | A1 | 9/2014 | Chait |
| 2014/0281528 | A1 | 9/2014 | Dubey et al. |
| 2015/0040181 | A1 | 2/2015 | Cook et al. |
| 2015/0058839 | A1 | 2/2015 | Madanapalli et al. |
| 2015/0074828 | A1 | 3/2015 | Beauregard et al. |
| 2015/0113515 | A1* | 4/2015 | Lachambre ............... G06F 8/60 717/168 |
| 2015/0128250 | A1 | 5/2015 | Lee et al. |
| 2016/0203313 | A1 | 7/2016 | El-Moussa et al. |
| 2016/0217159 | A1 | 7/2016 | Dahan et al. |
| 2016/0323314 | A1* | 11/2016 | Reddington .......... G06F 21/566 |
| 2016/0378962 | A1* | 12/2016 | Austin .................... G06F 21/31 726/17 |
| 2017/0011220 | A1 | 1/2017 | Efremov et al. |
| 2017/0048259 | A1 | 2/2017 | Dodge et al. |
| 2017/0054760 | A1 | 2/2017 | Barton et al. |
| 2017/0111368 | A1* | 4/2017 | Hibbert ................. H04L 63/083 |
| 2018/0024895 | A1 | 1/2018 | Kumarasamy et al. |
| 2018/0302409 | A1 | 10/2018 | Hope |
| 2019/0121631 | A1 | 4/2019 | Hua et al. |

FOREIGN PATENT DOCUMENTS

| | | |
|---|---|---|
| GB | 2538518 A | 11/2016 |
| GB | 2563066 A | 12/2018 |
| KR | 101308859 B1 | 9/2013 |
| WO | 2006101549 A2 | 9/2006 |
| WO | 2007089786 A2 | 8/2007 |
| WO | 2015183493 A1 | 12/2015 |
| WO | 2018174990 A1 | 9/2018 |

OTHER PUBLICATIONS

Chris Hoffman; "How to Disable System Integrity Protection on a Mac (and Why You Shouldn't)"; HowToGeek.com website [full url in ref.]; Jul. 5, 2017 (Year: 2017).
Examination Report dated Apr. 29, 2020 for United Kingdom Patent Application No. GB1715628.2.
Examination Report dated Jun. 14, 2019 for United Kingdom Patent Application No. GB1600738.7.
Combined Examination & Search Report dated Feb. 6, 2018 for United Kingdom Patent Application No. GB1714489.0.
Combined Examination & Search Report dated Aug. 1, 2018 for United Kingdom Patent Application No. GB1802241.8.
Combined Examination & Search Report dated Nov. 16, 2018 for United Kingdom Patent Application No. GB1808380.8.
Combined Examination & Search Report dated Mar. 6, 2019 for United Kingdom Patent Application No. GB1814798.3.
Combined Examination & Search Report dated Dec. 1, 2017 for United Kingdom Patent Application No. GB1708824.6.

\* cited by examiner

MANAGING PRIVILEGE DELEGATION ON A COMPUTER DEVICE

RELATED APPLICATIONS

This application claims the benefit of priority from GB 1802099.0, filed Feb. 8, 2018, the disclosure of which is incorporated herein by reference in its entirety.

TECHNICAL FIELD

The present invention relates generally to the field of computers and computer devices. More particularly, the present invention relates to a computer device and to a method of managing privilege delegation to control creation of processes on such a computer device.

BACKGROUND

Generally, it is desirable to implement a least-privilege access security model on computer devices, where each logged-in user is granted only a minimal set of access privileges by way of their respective user accounts. This model is particularly helpful for reducing the risk of attacks from malicious software (also known as malware) and avoiding inadvertent changes to settings on the computer devices (also known as system settings). Elevated administrator privileges are typically required by administrators, enabling the administrators to perform administrative tasks, such as installing software and drivers, changing the system settings, viewing or changing other user accounts, and running administrative tools.

However, the elevated administrator privileges, such as at local administrator level, may compromise security of the computer devices, for example by exposing vulnerabilities in the computer devices to malicious attacks, or allowing inadvertent changes to the system settings. Some least-privilege access security models provide multiple tiers or sets of access privileges to administrators, typically enabled by user account control services. In this way, an administrator may be granted a minimal set of access privileges by a user account control service, such as granted to a standard user, for normal tasks. To perform specific administrator tasks, the administrator may self-elevate via the user account control service, to be granted elevated administrator privileges. Such self-elevation is not available to standard users though elevation by the administrators via the user account control service may be granted selectively for certain flagged tasks that require administrator privileges. In this way, potential vulnerabilities due to administrator-only privileges are better addressed. For example, security of the computer devices is better maintained while inadvertent changes to system settings better avoided. For example, MICROSOFT (RTM) WINDOWS (RTM) provides User Account Control (UAC) (RTM), in which administrators are referred to as Protected administrators in their least-privileged states and as Elevated administrators in their elevated states. Consent to elevate is explicit, via a Consent UI provided by the UAC. Tasks requiring elevation may be indicated to the standard users and/or the administrators by the user account control service, for example via displayed message boxes including a UAC shield.

A difficulty arises in that the user account control services may be partially or even fully disabled, including by the administrators themselves, such that the administrators are granted administrator privileges for all tasks, including the normal tasks that require only a minimal set of access privileges. Such disabling may be to improve apparent usability, for example, so as to prevent indication of which tasks require elevation or to avoid repeated consent to self-elevate. However, by disabling the user account control services, the vulnerabilities due to administrator-only privileges that the user account control services seek to address are once again re-introduced. Furthermore, while disabling the user account control services may not immediately appear to affect standard users directly, those certain tasks that require administrator privileges and for which elevation is selectively granted by the administrators may no longer be flagged to the standard users. Instead, those certain tasks may be executed according only to standard user privileges, potentially resulting in unpredictable, unstable and/or unsuccessful execution.

The example embodiments have been provided with a view to addressing at least some of the difficulties that are encountered in current computer systems, whether those difficulties have been specifically mentioned above or will otherwise be appreciated from the discussion herein.

SUMMARY

According to the present invention there is provided a computer device, a computer-implemented method, and a computer-readable storage medium as set forth in the appended claims. Additional features will be appreciated from the dependent claims, and the description herein.

In one example, there is provided a computer device for managing privilege delegation to control creation of processes thereon, the computer device including at least a processor and a memory, the computer device comprising an operating system, a user account control service cooperating the operating system and an agent cooperating with the operating system, wherein the agent is arranged to: intercept a request from a user account of a logged-in user on the computer device to create a process according to first privileges in the user account on the computer device and to obtain information related to the request; determine whether to create the process in the user account on the computer device according to second privileges different from the first privileges, based at least in part on the obtained information, by hooking a query provided by the operating system to identify whether the user account control service cooperating the operating system is enabled, enquiring of the operating system whether to create the process in the user account on the computer device according to the second privileges whereupon the hooked query is invoked and confirming, in response to the invoked hooked query, that the user account control service is enabled; and cause the process to be created according to the second privileges in the user account by the operating system on the computer device, if it is determined to create the process in the user account on the computer device according to the second privileges.

In one example, the agent is arranged to intercept the request by hooking the request in a user space, an application space and/or a kernel provided by the operating system.

In one example, the agent is arranged to determine whether to create the process in the user account on the computer device according to the second privileges different from the first privileges by examining the information and referencing a policy file.

In one example, the agent is arranged to determine whether to create the process in the user account on the computer device according to the second privileges different from the first privileges by prompting the logged-in user via the user account for authorisation and receiving the authorisation therefrom.

In one example, the agent is arranged to cause the process to be created according to the first privileges in the user account by the operating system on the computer device, if it is determined to not create the process in the user account on the computer device according to the second privileges.

In one example, the agent is arranged to cause the process to be created according to the second privileges in the user account by the operating system on the computer device by delegating the second privileges to the process by providing a token, having the second privileges assigned thereto, to the process.

In one example, the user account control service cooperating the operating system is disabled.

In one example, the first privileges are associated with a standard user account and the second privileges are associated with an administrator account.

In one example, the user account is an administrator account.

In one example, the agent is arranged to unhook the hooked query in response to the hooked query being invoked.

In one example, there is provided a method of managing privilege delegation to control creation of processes on a computer device, the method being implemented by hardware of the computer device including at least a processor and a memory, the method comprising: intercepting, by an agent cooperating with an operating system of the computer device, a request from a user account of a logged-in user on the computer device to create a process according to first privileges in the user account on the computer device and obtaining information related to the request; determining, by the agent, whether to create the process in the user account on the computer device according to second privileges different from the first privileges, based at least in part on the obtained information, comprising hooking a query provided by the operating system to identify whether a user account control service cooperating the operating system is enabled, enquiring of the operating system whether to create the process in the user account on the computer device according to the second privileges whereupon the hooked query is invoked and confirming, in response to the invoked hooked query, that the user account control service is enabled; and causing, by the agent, the process to be created according to the second privileges in the user account by the operating system on the computer device, if it is determined to create the process in the user account on the computer device according to the second privileges.

In one example, intercepting the request comprises hooking the request in a user space, an application space and/or a kernel provided by the operating system.

In one example, determining, by the agent, whether to create the process in the user account on the computer device according to the second privileges different from the first privileges comprises examining, by the agent, the information and referencing, by the agent, a policy file.

In one example, determining, by the agent, whether to create the process in the user account on the computer device according to the second privileges different from the first privileges comprises prompting the logged-in user via the user account for authorisation and receiving the authorisation therefrom.

In one example, the method comprises causing, by the agent, the process to be created according to the first privileges in the user account by the operating system on the computer device, if it is determined to not create the process in the user account on the computer device according to the second privileges.

In one example, causing, by the agent, the process to be created according to the second privileges in the user account by the operating system on the computer device comprises delegating the second privileges to the process by providing a token, having the second privileges assigned thereto, to the process.

In one example, the user account control service cooperating the operating system is disabled.

In one example, the first privileges are associated with a standard user account and wherein the second privileges are associated with an administrator account.

In one example, the method comprises unhooking, by the agent, the hooked query in response to the hooked query being invoked.

In one example, a tangible non-transient computer-readable storage medium is provided having recorded thereon instructions which, when implemented by a computer device, cause the computer device to be arranged as set forth herein and/or which cause the computer device to perform any of the methods as set forth herein.

BRIEF DESCRIPTION OF THE DRAWINGS

For a better understanding of the invention, and to show how example embodiments may be carried into effect, reference will now be made to the accompanying drawings in which.

DETAILED DESCRIPTION

The following description includes example embodiments of a mechanism for managing privilege delegation to control to control creation of processes on a computer device. In at least some examples, the mechanism upholds security of the computer device while enabling creation of processes thereon. Many other advantages and improvements will be appreciated from the discussion herein.

Figure 1:
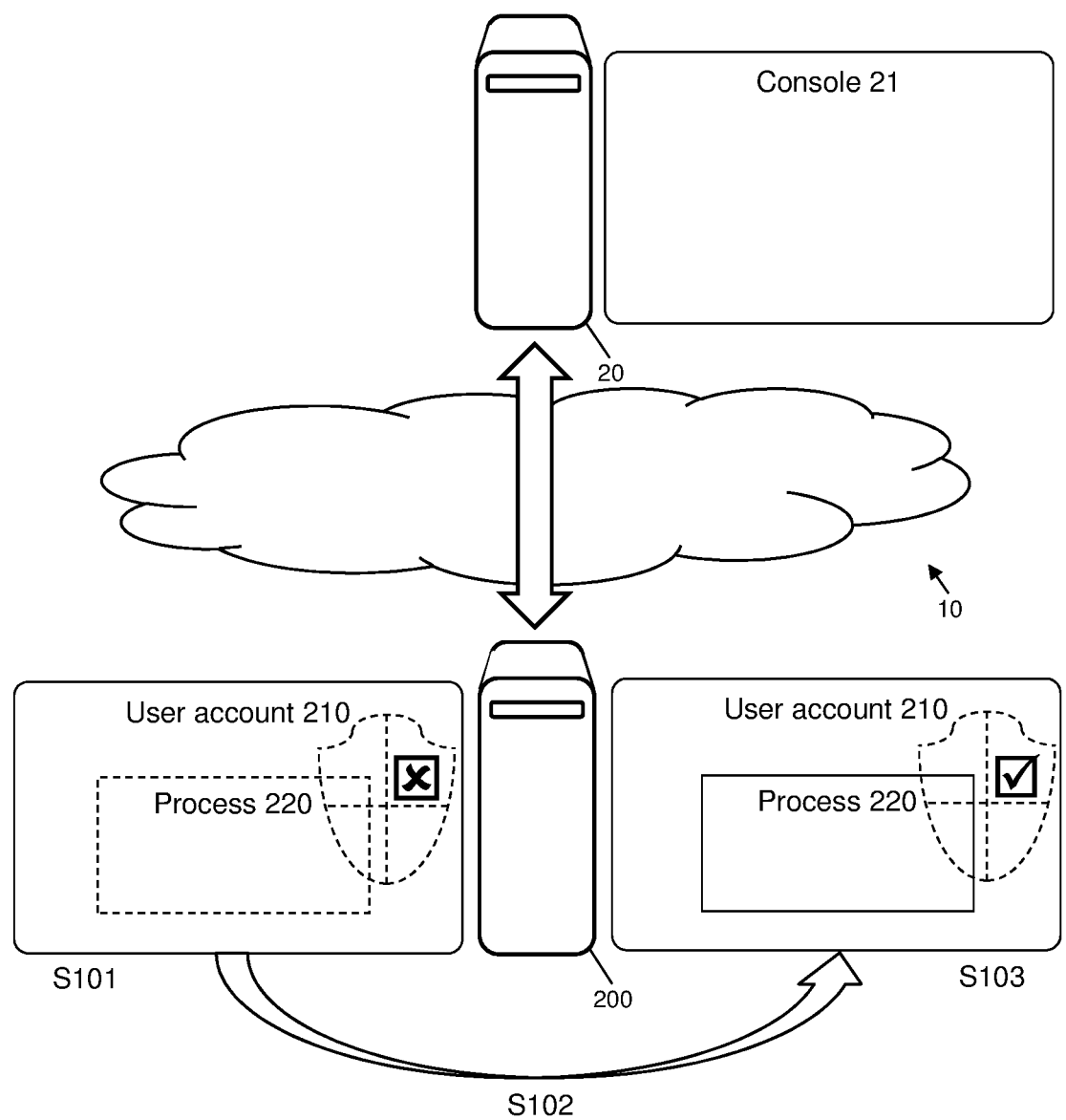
FIG. 1 is a schematic view of an example network including an example computer device.

FIG. 1 is a schematic view of an example network 10 including an example computer device 200. The network 10 also includes a set of servers 20. Particularly, the computer device 200 is configured to manage privilege delegation to control to control creation of processes thereon. In this way, a process may be created on the computer device as if a user account control service is enabled, even though the user account control service is disabled. In this way, vulnerabilities resulting otherwise from disabling of the user account control service, for example due to administrator-only privileges, may be avoided. Furthermore, creation of processes that do require privilege elevation, that would otherwise execute unpredictably, unstably and/or unsuccessfully according only to standard user privileges, may be successful.

In more detail, the computer device 200 is arranged to intercept a request from a user account 210 of a logged-in user on the computer device 200 to create a process 220 according to first privileges in the user account 210 on the computer device 200. The computer device 200 is arranged to obtain information related to the intercepted request. The computer device 200 is arranged to determine whether to create the process 220 in the user account 210 on the computer device 200 according to second privileges different from the first privileges, based at least in part on the obtained information, by hooking a query provided by an operating system thereof to identify whether a user account control service cooperating the operating system is enabled, enquiring of the operating system whether to create the process 220 in the user account on the computer device 200 according to the second privileges whereupon the hooked query is invoked and confirming, in response to the invoked hooked query, that the user account control service is enabled; and cause the process to be created according to the second privileges in the user account by the operating system on the computer device 200, if it is determined to create the process in the user account 210 on the computer device 200 according to the second privileges.

In use, at S101, the computer device 200 intercepts the request from the user account 210 of the logged-in user on the computer device 200 to create the process 220 according to first privileges, for example standard user privileges, in the user account 210 on the computer device 200 and obtains information related to the request. The request may result from the logged-in user double-clicking on an icon for the process 220, for example, or requesting to run the process 220 from a command window. That is, the creation of the process 220 is associated, at least initially, with the standard user privileges of the logged-in user, as assigned to the user account 210. A shield in FIG. 1 at S101 is indicated by a dashed line and includes a cross, to indicate that the user account control service is disabled. The process 220 is indicated by a dashed line to indicate that creation of the process 220 is requested but not, as yet, completed.

At S102, the computer device 200 determines whether to create the process 220 in the user account 210 on the computer device 200 according to second privileges, for example local administrator privileges, different from the first privileges, based at least in part on the obtained information. Determining comprises hooking the query provided by the operating system to identify whether the user account control service cooperating the operating system is enabled, enquiring of the operating system whether to create the process 220 in the user account 210 on the computer device 200 according to the second privileges whereupon the hooked query is invoked and confirming, in response to the invoked hooked query, that the user account control service is enabled.

At S103, the computer device 200 causes the process 220 to be created according to the second privileges in the user account 210 by the operating system on the computer device 200, if it is determined to create the process in the user account 210 on the computer device 200 according to the second privileges. That is, the creation of the process 220 is now associated with the elevated local administrator privileges, rather than the original standard user privileges of the logged-in user, as assigned to the user account 210. In this way, the process 220 may be created according to the appropriate privileges, such that the process executes successfully. Conversely, if the first privileges are local administrator privileges and standard user second privileges are sufficient for creation of the process 220, then the computer device 200 may downgrade the privileges accordingly, so as to avoid the vulnerabilities described previously. In this way, security of the computer device 200 may be better upheld. The shield in FIG. 1 at S103 is indicated by a dashed line and includes a check mark (also known as a tick), to indicate that while the user account control service is disabled, the computer device 200 has been spoofed that the user account control service is enabled. The process 220 is indicated by a solid line to indicate that creation of the process 220 is now completed.

The network 10 may be a private network, a virtual private network, an intranet, a cloud, or the Internet. In practice, computing environments for large-scale corporations will typically include many thousands of coupled individual computer devices 200.

Figure 2:
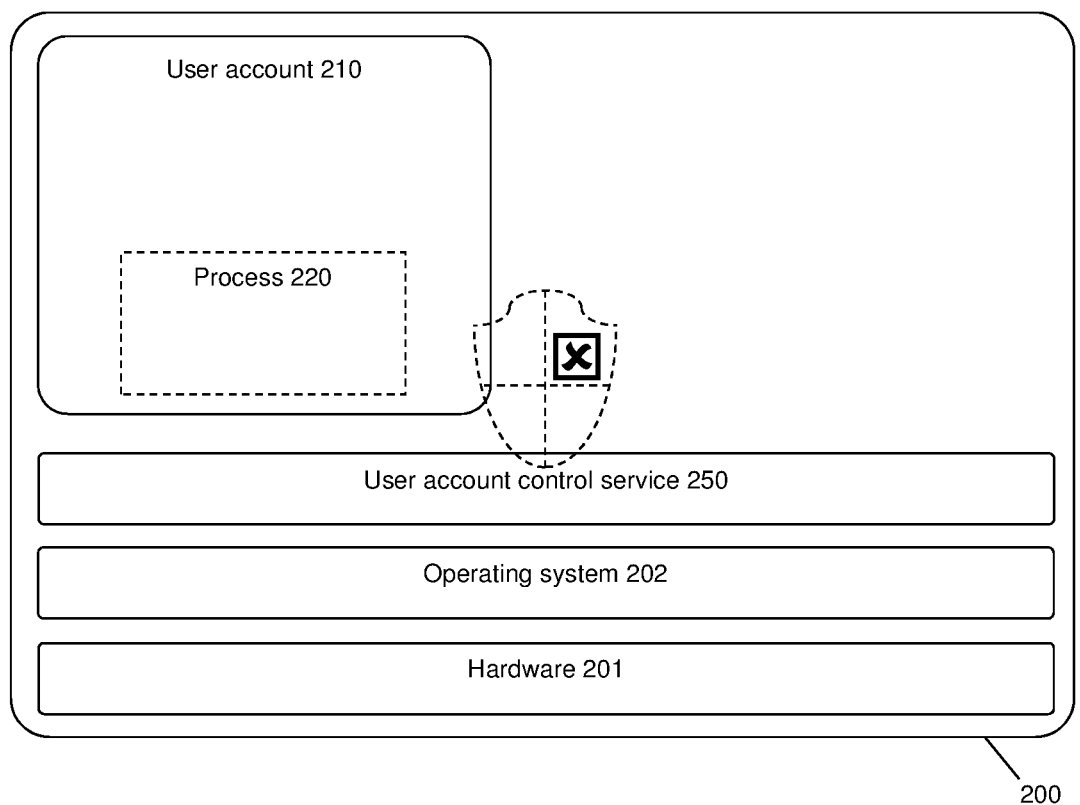
FIG. 2 is a schematic view of the example computer device in more detail.

FIG. 2 is a schematic view of the example computer device 200, in more detail.

Some of the example embodiments are discussed in detail in relation to computers and computer devices using the WINDOWS (RTM) operating system, as supplied by MICROSOFT Corporation of Redmond, Wash., USA, under the trade marks WINDOWS NT, WINDOWS 2000, WINDOWS XP, WINDOWS Vista, WINDOWS Server 2003, WINDOWS Server 2008, WINDOWS 7, WINDOWS 8, WINDOWS 10 or later versions, amongst others. However, the teachings, principles and techniques of the present invention are also applicable in other practical embodiments. For example, the described embodiments are also applicable to other operating systems, such as UNIX (RTM), LINUX (RTM), MAC OS (RTM), IOS (RTM) and ANDROID (RTM), and in particular those having a discretionary access control (DAC) security model.

The computer device 200 may take any suitable form factor. As examples, the computer device 200 may be a desktop computer, a portable computing device, laptop, tablet, smartphone, wearable device, or an emulated virtual device on any appropriate host hardware. The computer device 200 comprises a layer of hardware (H/W) 201, which suitably includes memory, processors (CPU central processor units), I/O input/output interfaces (e.g. NIC network interface cards, USB universal serial bus interfaces, etc.), storage (e.g. solid state non-volatile storage or hard disk drive), and so on. An operating system 202, for example WINDOWS 7, WINDOWS 8 or WINDOWS 10, runs on the hardware layer 201 to provide a runtime environment for execution of user processes and applications, such as the process 220. This runtime environment typically provides resources such as installed software, system services, drivers, and files. The process 220 is indicated by a dashed line to indicate that creation of the process 220 is requested but not, as yet, completed.

Security Model

Generally, operating systems such as the operating system 202 on the computer device 200, apply security models wherein access privileges are based on user accounts, such as the user account 210. The operating systems, via privilege access management services cooperating therewith respectively for example, may define privilege levels appropriate to different classes of users, or groups of users, and then apply the privileges of the relevant class or group to the particular logged-in user (e.g. ordinary user, super-user, local administrator, system administrator and so on). A current user is authenticated such as by logging-in to the computer device 200, e.g. with a user identity and password, and these user credentials may be validated locally or via a remote agent service such as a domain controller. The logged-in user, via their previously prepared security account, thus acts as a security principal in the security model on the computer device 200. The operating system 202 of the computer device 200 then grants privileges, appropriate to the security context of the user account 210, to processes and commands to be executed in the user account 210. Particularly, when executing in the user account 210, the operating system 202 grants privileges to the processes, for example the process 220, by default.

When considering privilege management, it is desirable to implement a least-privilege access security model, whereby each user is granted only a minimal set of access privileges for their user account, such as the user account 210, for example the first privileges. However, many applications and/or commands require a relatively high privilege level, such as a local administrator level, in order to install, operate and/or execute correctly. That is, conventionally, such relatively high privilege rights must be granted to the logged-in user so as to be able to execute shell commands in the user account 210 on the computer device 200. Hence, in practice, there is a widespread tendency to grant elevated privilege rights, such as the local administrator level, or a system administrator level, to all members of a relevant user group, such as on the computer device 200, and thus allow access to almost all of the resources of computer devices, such as the computer device 200. This level of access may be greater than is desirable or appropriate from a security viewpoint. For example, there is a possibility of accidental tampering with the computer devices, leading to errors or corruption within the computer devices. Further, an infection or malware may maliciously access resources of the computer devices with the deliberate intention of subverting security or causing damage, such as by modifying a normal and otherwise harmless application, e.g. to hide a key log to obtain credit card numbers or bank details.

In this example, the first privileges and second privileges are different. It should be understood that the first privileges are assigned to the user account 210 because, for example, the logged-in user is a member of a group to which the first privileges are assigned. In one example, the user account 210 is a standard user account. In one example, the user account 210 is an administrator account, for example a local administrator account. In one example, the user account 210 has assigned thereto default standard user privileges (i.e. the first privileges), thereby conforming with the least-privilege access security model. In one example, the user account 210 has assigned thereto local administrator privileges (i.e. the first privileges). In one example, the first privileges are standard user privileges and the second privileges are elevated privileges, for example administrator privileges or local administrator privileges. In one example, the first privileges are associated with a standard user account and the second privileges are associated with an administrator account. In this way, processes, for example the process 220, requiring elevated privileges may be created according to the second privileges so as to run successfully. In one example, the first privileges are elevated privileges, for example administrator privileges or local administrator privileges and the second privileges are downgraded privileges, for example standard user privileges. In one example, the user account 210 is an administrator account. In this way, processes, for example the process 220, requiring only downgraded privileges may be created according to the second privileges, thereby conforming with the least-privilege access security model.

User Account Control Service

The computer device 200 comprises a user account control (UAC) service 250 cooperating with and/or provided by the operating system 202. In one example, the user account service 250 is a part of a security system, provided by and/or for the operating system 202, to implement a security model as described herein. As described above, some least-privilege access security models provide multiple tiers or sets of access privileges to administrators, typically enabled by user account control services. In this way, an administrator may be granted a minimal set of access privileges by the user account control service 250, such as granted to a standard user, for normal tasks. To perform specific administrator tasks, the administrator may self-elevate via the user account control service 250, to be granted elevated administrator privileges. Such self-elevation is not available to standard users though elevation by the administrators via the user account control service 250 may be granted selectively for certain flagged tasks that require administrator privileges. For example, MICROSOFT (RTM) WINDOWS (RTM) provides User Account Control (UAC) (RTM), in which administrators are referred to as Protected administrators in their least-privileged states and as Elevated administrators in their elevated states. Consent to elevate is explicit, via a Consent UI provided by the UAC. Tasks requiring elevation may be indicated to the standard users and/or the administrators by the user account control service 250, for example via displayed message boxes including a UAC shield. UAC covers three main areas including application compatibility (shims), fusion (manifests) and installer detection.

According to a default or conventional behaviour of the computer device 200, the user account control service 250 may be partially or even fully disabled, including by administrators themselves, such that the administrators are granted administrator privileges for all tasks, including the normal tasks that require only a minimal set of access privileges. However, by disabling the user account control service 250, the vulnerabilities due to administrator-only privileges that the user account control service 250 seeks to address are once again re-introduced. Furthermore, while disabling the user account control service 250 may not immediately appear to affect standard users directly, those certain tasks that require administrator privileges and for which elevation is selectively granted by the administrators may no longer be flagged to the standard users. Instead, those certain tasks may be executed according only to standard user privileges, potentially resulting in unpredictable, unstable and/or unsuccessful execution. A shield in FIG. 2 is indicated by a dashed line and includes a cross, to indicate that the user account control service 250 is disabled, in this example.

Agent

Figure 3:
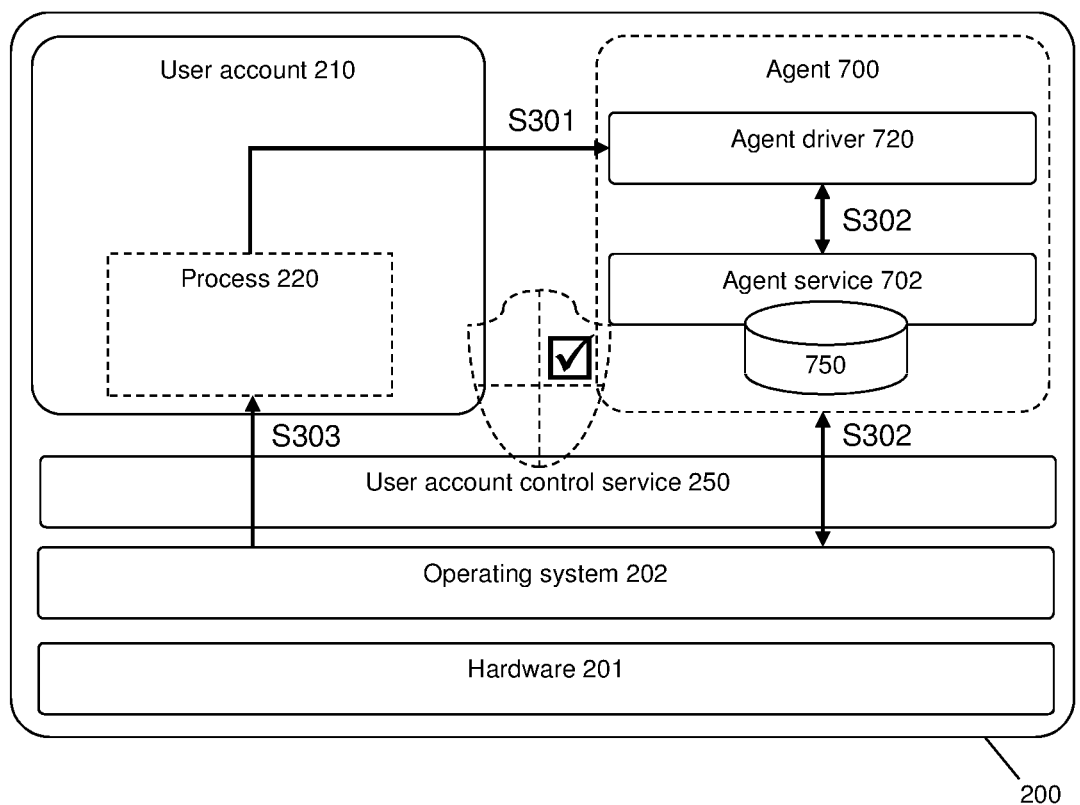
FIG. 3 is a schematic view of the example computer device in more detail.

FIG. 3 is a schematic view of the example computer device 200, in more detail.

In this example, the server device 200 further comprises an agent 700, configured to operate in cooperation with the operating system 202. Particularly, the agent 700 manages privilege delegation to control creation of processes on the computer device 200 by selectively causing the processes to be created according to least privileges required for their successful execution, even if the user account control service 250 is disabled, in contrast to the conventional behaviour described with reference to FIG. 2. The agent 700 may comprise one or more software and/or hardware modules, such as executables, dynamic link libraries (DLLs), plugins, add-ins, add-ons or extensions. In this example, the agent 700 supports core capabilities for security of the computer device 200. In particular, the agent 700 suitably implements at least a privilege management function and an application control function. The agent 700 thus acts as a secure gatekeeper to control activity on the computer device 200 in addition to, and in cooperation with, the existing security mechanisms of the operating system 202.

In the context of WINDOWS operating systems, the agent 700 may comprise a service cooperating with the operating system 202. The agent may thus act as a core module or kernel component. In a macOS environment, the agent 700 may comprise a daemon, which runs as a background process on the computer device 200.

In this example, the computer device 200 comprises the agent 700 cooperating with the operating system 202. Particularly, in this example, the agent 700 comprises an agent service 702 and an agent driver 720. However, this example is not limiting and other implementations are possible. For example, more, fewer or different software components may be provided to provide the functionality of the agent 700. In one example, the agent 700 comprises an agent service 702 and an agent user mode driver 720—i.e. the agent driver 720 is a user mode driver. In one example, the agent 700 comprises an agent service 702 and an agent kernel mode driver 720—i.e. the agent driver 720 is a kernel mode driver. In one example, the agent 700 comprises an agent service 702 and an agent plug-in 720—i.e. the agent driver 720 is a DLL, plug-in, add-in, add-on or extension. In turn, the agent service 702 and/or the agent driver 720 may comprise one or more software components, for example an agent plug-in.

The agent 700, for example the agent driver 720, is arranged to intercept the request from the user account 210 of the logged-in user on the computer device 200 to create the process 220 according to first privileges in the user account 210 on the computer device 200. In one example, the agent 700, for example the agent driver 720, is arranged to intercept the request from the user account 210 of the logged-in user on the computer device 200 by hooking a function through which the request is passed, for example a default function of the operating system 202 and/or the user account control service 250. In one example, the agent 700, for example the agent driver 720, is arranged to intercept the request from the user account 210 of the logged-in user on the computer device 200 by exposing a function, for example a function through which the request is passed, corresponding to a default function of the operating system 202 and/or the user account control service 250 and receiving the request via the exposed function. In this way, the agent 700, for example the agent driver 720, may receive the request in preference to (i.e. before, instead of) the operating system 202 and/or the user account control service 250, for example.

In MICROSOFT WINDOWS, the agent 700, for example the agent driver 720, may be arranged to hook and/or expose a function through which all process creation requests are passed, such as CreateProcess or CreateProcessInternalW:

```
BOOL WINAPI CreateProcess(
  _In_opt_ LPCTSTR lpApplicationName,
  _Inout_opt_ LPTSTR lpCommandLine,
  _In_opt_ LPSECURITY_ATTRIBUTES lpProcessAttributes,
  _In_opt_ LPSECURITY_ATTRIBUTES
  lpThreadAttributes, _In_ BOOL bInheritHandles,
  _In_ DWORD dwCreationFlags,
  _In_opt_ LPVOID lpEnvironment,
  _In_opt_ LPCTSTR lpCurrentDirectory,
  _In_ LPSTARTUPINFO lpStartupInfo,
  _Out_ LPPROCESS_INFORMATION lpProcessInformation
);
```

As all process creation requests pass through the CreateProcess function, this is when the agent 700, for example the agent driver 720, may determine whether to create the process in the user account 210 on the computer device 200 according to the second privileges, as described below in more detail.

In one example, the agent 700, for example the agent driver 720, is arranged to intercept the request by hooking the request in a user space and/or an application space provided by the operating system 202. In other words, the agent 700, for example the agent driver 720, may be comprise and/or be a user mode driver and/or a plug-in arranged to hook the request in the user space and/or the application space provided by the operating system 202. In one example, the agent 700, for example the agent driver 720, is arranged to intercept the request by hooking the request in a kernel provided by the operating system 202. In other words, the agent 700, for example the agent driver 720, may comprise and/or be a kernel mode driver arranged to hook the request in the kernel provided by the operating system 202.

In MICROSOFT WINDOWS, the agent 700, for example the agent driver 720, may be arranged to hook the request by hooking a function such as CreateProcessInternalW:

```
DWORD WINAPI CreateProcessInternalW(
  _—in      DWORD unknown1,
  _—in_opt  LPCTSTR lpApplicationName,
  _—inout_opt LPTSTR lpCommandLine,
  _—in_opt  LPSECURITY_ATTRIBUTES lpProcessAttributes,
  _—in_opt  LPSECURITY_ATTRIBUTES lpThreadAttributes,
  _—in      BOOL bInheritHandles,
  _—in      DWORD dwCreationFlags,
  _—in_opt  LPVOID lpEnvironment,
  _—in_opt  LPCTSTR lpCurrentDirectory,
  _—in      LPSTARTUPINFO lpStartupInfo,
  _—out     LPPROCESS_INFORMATION lpProcessInformation,
  _—in      DWORD unknown2
);
```

As all process creation requests pass through the CreateProcessInternalW function, this is when the agent 700, for example the agent driver 720, may determine whether to create the process in the user account 210 on the computer device 200 according to the second privileges, as described below in more detail.

The agent 700, for example the agent driver 720, is arranged to obtain information related to the request. In one example, the agent 700, for example the agent driver 720, is arranged to obtain details, for example metadata, of the user account 210, for example the user identity of the logged-in user of the user account 210 and/or the first privileges thereof. In one example, the agent 700, for example the agent driver 720, is arranged to obtain details, for example metadata, of the process 220. In one example, the agent 700, for example the agent driver 720, is arranged to obtain a token and/or information relating to the token, wherein the token is associated with the request, the user account 210 and/or the process 220. Tokens are described in more detail below. In one example, the agent 700, for example the agent driver 720, is arranged to obtain information related to the request by extracting one or more parameters included in the request. In one example, the agent driver 720 is arranged to forward the obtained information to the agent service 702.

In one example, agent 700, for example the agent driver 720 and/or the agent service 702, is arranged to resolve the request, for example, to determine a path of the process 220 on the computer device 200.

The agent 700, for example the agent service 702, is arranged to determine whether to create the process 220 in the user account 210 on the computer device 200 according to second privileges different from the first privileges, based at least in part on the obtained information, by hooking the query provided by the operating system 202 to identify whether the user account control service 250 cooperating the operating system 202 is enabled, enquiring of the operating system 202 whether to create the process 220 in the user account 210 on the computer device 200 according to the second privileges whereupon the hooked query is invoked and confirming, in response to the invoked hooked query, that the user account control service 250 is enabled.

Particularly, the agent 700, for example the agent service 702, is arranged to hook the query provided by the operating system to identify whether the user account control service 250 cooperating the operating system 202 is enabled. In this way, the agent 700, for example the agent service 702, may control a response to the query, such as respond that the user account control service 250 is enabled even though the user account control service 250 is disabled, or vice versa. In one example, the agent 700, for example the agent service 702, is arranged to hook the query, provided by the operating system to identify whether the user account control service 250 cooperating the operating system 202 is enabled, in response to intercepting the request from the user account 210 of the logged-in user on the computer device 200 to create the process 220 according to first privileges in the user account 210 on the computer device 200. In this way, the agent 700, for example the agent service 702, may dynamically hook the query only to handle requests to create processes, while other requests that also invoke the same query are handled according to a default behaviour of the computer device 200.

In MICROSOFT WINDOWS, the agent 700, for example the agent service 702, may be arranged to hook the query RtlQueryElevationFlags in ntdll.dll which returns a set of flags indicating states of various elevation related features:

```
NTSTATUS NTAPI RtlQueryElevationFlags (
    DWORD* pFlags
)
``` where pFlags is a pointer to a variable that receives the elevation state. On exit, the elevation state can be zero (i.e. UAC is disabled) or one or more of the following:
ELEVATION_UAC_ENABLED (0x1) i.e. UAC is enabled
ELEVATION_VIRTUALIZATION_ENABLED (0x2) i.e. File and registry virtualization is enabled
ELEVATION_INSTALLER_DETECTION_ENABLED (0x4) i.e. Install and setup programs are detected and automatically elevated.
During process creation, the status of UAC is checked within the functions CheckElevationEnabled (WINDOWS 7), BasepGetAppCompatData (WINDOWS 10) and BaseCheckElevation. In more detail, RtlQueryElevationFlags checks three flags within SharedDataFlags which is a set of memory location. Looking into RtlQueryElevationFlags' implementation the third bit (flag) is DbgInstallerDetectEnabled, the second bit is DbgVirtEnabled and the first bit is DbgElevationEnabled. The returned variable is thus a hexadecimal value between 0-7, in which the first bit DbgElevationEnabled is of relevance in this example.

In one example, the agent 700, for example the agent service 702, is arranged to hook the query provided by the operating system 202 to identify whether the user account control service 250 cooperating the operating system 202 is enabled, if the user account control service 250 is disabled. In one example, the agent 700, for example the agent service 702, is arranged to query the operating system 202 to identify whether the user account control service 250 cooperating the operating system 202 is enabled and if the user account control service 250 is disabled, the agent 700, for example the agent service 702, is arranged to hook the query, as described above. In this way, hooking the query is selective upon the status of the user account control service 250 such that if the user account control service 250 is enabled, creation of the process 220 may proceed conventionally. However, if the user account control service 250 is disabled, the agent 700 may control creation of the process 220 as if the user account control service 250 were enabled.

The agent 700, for example the agent service 702, is arranged to enquire of the operating system 202 whether to create the process in the user account 210 on the computer device 200 according to the second privileges. Upon such an enquiry, the hooked query is invoked. In this way, the agent 700, for example the agent service 702, may instruct the operating system 202 to perform those checks required to determine if privilege elevation or downgrading, for example, is required for the requested process 220.

In MICROSOFT WINDOWS, the agent 700, for example the agent service 702, may be arranged to call a function IsElevationRequired which determines whether the user account 210 needs to be elevated to execute a file i.e. create the process 220:

```
BOOL WINAPI IsElevationRequired (
    LPCWSTR pwszExeFile
)
``` where pwszExeFile is a path of the executable file (i.e. the process 220) to check. This function returns non-zero if elevation is required and zero otherwise or if the function fails. This function then calls CheckElevation from kernel32.dll in turn and checks the information it returns against the current user's token. In more detail, IsElevationRequired returns a Boolean value. The value is one if the application would require elevation in the case when UAC is on (or if the hooked query is spoofing that UAC is on), or zero if the path does not match elevation criteria, or UAC is off. A process that usually requires elevation may launch as a standard user with medium integrity but this may lead to incorrect execution.

The agent 700, for example the agent service 702, is arranged to confirm, in response to the invoked hooked query, that the user account control service 250 is enabled. According to a default behaviour of the operating system 202, a response to the invoked query that the user account control service 250 is disabled will cause the operating system 202 to limit or even abort those checks required to determine if privilege elevation or downgrading, for example, is required for the requested process 220. In such a conventional case, the operating system 202 may return a negative result by default to the enquiry of the operating system 202 whether to create the process in the user account 210 on the computer device 200 according to the second privileges. Hence, by responding to the invoked hooked query that the user account control service 250 is enabled, the agent 700, for example the agent service 702, may cause the operating system 202 to perform the checks as if the user account control service 250 is enabled, even if the user account control service 250 is disabled. In one example, the user account control service 250 cooperating the operating system 202 is disabled. Even in such an example in which the user account control service 250 is disabled, the agent 700, for example the agent service 702, still confirms, in response to the invoked hooked query, that the user account control service 250 is enabled. In other words, the agent 700, for example the agent service 702, spoofs the response to the invoked hooked query.

In MICROSOFT WINDOWS, the agent 700, for example the agent service 702, may be arranged to hook the query RtlQueryElevationFlags and to returns the flag pFlags indicating that UAC is enabled i.e. ELEVATION_UAC_ENABLED (0x1).

In one example, the agent 700, for example the agent service 702, is arranged to determine whether to create the process 220 in the user account on 210 the computer device 200 according to the second privileges different from the first privileges by examining the information and referencing a policy file 750, as described below in more detail. In this way, the agent 700, for example the agent service 702, may determine whether to selectively create the process 220, based at least in part on, for example, the logged-in user and/or the requested process 220.

In one example, the agent 700, for example the agent service 702, is arranged to determine whether to create the process 220 in the user account 210 on the computer device 200 according to the second privileges different from the first privileges by prompting the logged-in user via the user account 210 for authorisation and receiving the authorisation therefrom. In this way, the logged-in user may be informed that elevation is required, for example, and the logged-in user may authorise the elevation. Alternatively, a local administrator may authorise the elevation, for example. Prompting the logged-in user via the user account 210 for authorisation may be by custom messaging, for example, displaying a message dialog, as described below in more detail.

In one example, the agent 700, for example the agent service 702, the agent driver 720 and/or the agent service 702 via the agent driver 720, is arranged to determine whether to create the process 220 in the user account 210 on the computer device 200 according to the second privileges different from the first privileges according to a previous request related to the process 220, for example by referencing a file or cache including an identifier of the process 220 and a result of a previous determination. In this way, a processing overhead may be reduced because the result of the determination may be in respect of the process 220 only, thereby not requiring a subsequent determination. In one example, the agent 700, for example the agent service 702, the agent driver 720 and/or the agent service 702 via the agent driver 720, is arranged to an identifier of the process 220 and the result of the determination in a file or cache, for example.

The agent 700, for example the agent service 702, the agent driver 720 and/or the agent service 702 via the agent driver 720, is arranged to cause the process 220 to be created according to the second privileges in the user account 210 by the operating system 202 on the computer device 200, if it is determined to create the process 220 in the user account 210 on the computer device 200 according to the second privileges. In this way, even if the user account control service 250 is disabled, vulnerabilities due to administrator-only first privileges may be avoided while creation of processes according to standard user first privileges, that do require privilege elevation for successful execution, may be elevated appropriately.

In one example, the agent 700, for example the agent service 702, the agent driver 720 and/or the agent service 702 via the agent driver 720, is arranged to cause the process 220 to be created according to the first privileges in the user account 210 by the operating system 202 on the computer device 200, if it is determined to not create the process 220 in the user account 210 on the computer device 200 according to the second privileges. In other words, neither privilege elevation not privilege downgrading for creation of the process 220 is required.

In one example, the agent 700, for example the agent service 702, the agent driver 720 and/or the agent service 702 via the agent driver 720, is arranged to cause the process 220 to be created according to the second privileges in the user account 210 by the operating system 202 on the computer device 200 by delegating the second privileges to the process 220. In other words, the agent 700, for example the agent service 702, the agent driver 720 and/or the agent service 702 via the agent driver 720, may selectively enable access to higher privilege levels, such as a local administrator level, when needed to perform certain tasks, such as create the process. Thus the agent 700, for example the agent service 702, the agent driver 720 and/or the agent service 702 via the agent driver 720, provides the privilege level to perform a specific task, but does not provide a general high level privilege to the user account 210. Conversely, the agent 700, for example the agent service 702, the agent driver 720 and/or the agent service 702 via the agent driver 720, may downgrade the privilege level, so that certain tasks are carried out at a privilege level lower than that of the user account 210.

In one example, the agent 700, for example the agent service 702, the agent driver 720 and/or the agent service 702 via the agent driver 720, is arranged to delegate the second privileges to the process 220 by providing a token (also known as an access token). In one example, the token is an impersonation token. In one example, the agent 700, for example the agent service 702, the agent driver 720 and/or the agent service 702 via the agent driver 720, is arranged to replace an original token, having the first privileges assigned thereto, associated with the request with a token having the second privileges assigned thereto.

Generally, access tokens are objects that describe the security contexts of respective processes or threads. The tokens include the identities and privileges of the respective user accounts associated with the processes or threads. For example, when a user logs in to a user account on a computer device, the computer device verifies the user's password by comparing the password with information stored in a security database. If the password is authenticated, the computer device produces an access token. Every process executed on behalf of this user has a copy of this access token. The computer device uses the access token (or copy thereof) to identify the user when a thread interacts with a securable object or tries to perform a task that requires privileges. Generally, the access tokens include the following information: a security identifier (SID) of the user account; SIDs for groups of which the user is a member; a logon SID that identifies the current logon session; a list of the privileges held by either the user or the user's groups; an owner SID;

an SID for the primary group; a default discretionary access control list (DACL) that the computer device uses when the user creates a securable object without specifying a security descriptor; a source of the token; whether the token is a primary or impersonation token; an optional list of restricting SIDs; current impersonation levels; and other statistics. Every process has a primary token that describes the security context of the user account associated with the process. By default, the system uses the primary token when a thread of the process interacts with a securable object. Moreover, a thread can impersonate a client account. Impersonation allows the thread to interact with securable objects using the client's security context. A thread that is impersonating a client has both a primary token and an impersonation token.

In one example, the agent 700, for example the agent service 702, is arranged to enquire of the operating system 202 whether to create the process in the user account 210 on the computer device 200 according to the second privileges using a thread arranged to impersonate the user account 210. Impersonating the user account 210 may be necessary as elevation may dependent on the security of the calling user and their SID. Impersonating the user account 210 may be also necessary for supporting applications (i.e. processes such as the process 220) run through runas (RunAs.exe) on the command line.

In MICROSOFT WINDOWS, specific checks relating to the security of the calling user and their SID may be performed in the function LUAGetUserType.

In one example, a security descriptor of the access token to the thread is modified. For example, the security descriptor of the access token to the thread may be modified such that the impersonated user has access to the access token.

In MICROSOFT WINDOWS, functions LUAIsElevatedToken and LUAIsUIAToken both make calls to NtQueryInformationToken to open the token of the thread. Hence, by modifying the security descriptor as described above, calling these functions may return successfully.

In one example, the agent 700, for example the agent service 702, is arranged to unhook the hooked query in response to the hooked query being invoked. In this way, the agent 700, for example the agent service 702, may confirm, in response to the invoked hooked query, that the user account control service 250 is enabled at most once such that subsequent invocations of the query are not hooked and instead handled by default by the operating system 202. Hence, if and/or when the query is subsequently invoked, the true status (i.e. enabled or disabled) of the user account control service 250 is returned, rather than the enabled status provided by the agent 700, for example the agent service 702, via the hooked query.

In one example, the agent service 702 is arranged to determine whether to execute the command in the second user account 220 on the server device 200 according to the second privileges by examining the information forwarded by the agent driver 720 and referencing a policy file 750, as described below in more detail.

In one example, the agent 700, for example the agent service 702, is arranged to determine whether to create the process 220 in the second user account 210 on the computer device 200 according to the second privileges by denying to create (i.e. blocking) the process 220 in the user account 210 on the computer device 200 according to the second privileges. In one example, a specific process is blacklisted (i.e. blocked). In one example, a specific process is whitelisted (i.e. permitted). In one example, a specific user, user account and/or user group is blacklisted (i.e. blocked). In one example, a specific user, user account and/or user group is whitelisted (i.e. permitted).

Passive Handling

In one example, the agent 700, for example the agent service 702, is configured to perform passive handing of the request. In this case, the request is forwarded as received (i.e. without determination, evaluation and/or modification) to the operating system 202, as the originally intended recipient. In one example, passive handling is defined by the policy file 750. The agent 700 can meanwhile audit the requests which were handled passively, again consistent with the policy file 750, as described below in more detail. This passive handling function allows the request to proceed according to the default behaviour of the computer device 200 while the requesting user process or application is unaware of the agent 700 as intermediary. Advantageously, the default behaviour of computer device 200 is maintained for those requests that the agent 700 determines should have passive handling. Also, there is now a fail-safe option, in that the computer device 200 will maintain an expected behaviour for actions that are passively handled. This passive handling is useful particularly in the event that a particular user or request is not specified in the policy file 750, because default behaviour is still enacted. Hence, the computer device 200 can now quickly and safely supersede the original behaviour for specific situations, allowing rapid responses and network-wide consistency when needed, while still enabling existing legacy functionality and behaviour to continue in place for other actions, users and/or devices, as appropriate.

Policy File

In one example, the agent 700, for example the agent service 702, is coupled to a policy file 750. In one example, the agent service 702 is coupled to the policy file 750. The policy file 750 stores a set of policies (also known as rules) which define responses of the agent 700 to requested actions or tasks. A policy server may be provided to make policy decisions based on the policy file 750. Suitably, the policy server is provided as a service locally on the computer device 200 which links to other components of the agent 700, for example the agent service 702. That is, the policy server may reside as a component within the agent 700, or may be implemented as a separate service that is communicably linked to the agent 700, for example the agent service 702. The policy server may operate by receiving a policy request message, concerning a requested action and related meta-information, and returning a policy result based thereon. In one example, the agent 700, for example the agent service 702, is configured to capture a set of identities, and may then provide these identities as part of the policy request. Such identities may include, for example, a user identity (UID) of the user account 210, a group identity (GID) of a group to which the user account 210 belongs, a process identity (PID) of a current process which has initiated the action or task in question, and/or a process identity of any parent process (PPID). Suitably, the policy server determines an outcome for the request based on the provided set of identities relevant to the current policy request.

In one example, the policy file 750 is a structured file, such as an extensible mark-up language XML file. The policy file 750 is suitably held locally on the host device 200, ideally in a secure system location which is accessible to the agent 700 and/or the policy server as appropriate, but which is not accessible by the user account 210. Updates to the policy file 750 may be generated elsewhere on the network 10, such as by using a management console on another server, and then pushed, or pulled, to each instance of the agent 700 on each computer device 200. The policy file 750 is readily updated and maintained, ensuring consistency for all devices across the network. In this way, the agent 700 is robust and manageable for a large-scale organisation with many thousands of individual computer devices 200. Also, the agent 700 is able to leverage rules which have been developed in relation to application control, such as defining user groups or user roles and related application permissions, and now extend those same rules also to privilege management, and vice versa.

Once the agent 700, for example the agent driver 720, has intercepted the request, information related to the user account 210 and the requested process, for example, may be evaluated against the rules in the policy file 750.

The policy file 750 allows policies to be created at any suitable level of granularity. Thus, policies may be defined by process type, wherein only certain types of process may be given elevated privilege levels.

In general, evaluating the rules by the agent 700, for example the agent service 702, may produce one of a predetermined set of outcomes. In one instance, permission should be given to create the requested process. In another instance, the requested process should be blocked i.e. not created. In a third instance, a specific rule does not exist, or the rules check returns an indication to operate in the passive-handling mode as already explained above.

Custom Messaging

In one example, the agent 700, for example the agent service 702, is configured to perform custom messaging. In particular, the agent 700, for example the agent service 702, whether acting directly or via a cooperating proxy or plug-in, may present a message dialog to the logged-in user via the user account 210. This message dialog may be presented in a terminal from which a current action of interest was invoked by or on behalf of the user. Thus, the custom messaging may be presented on a display of the computer device 200 for interaction with the logged-in user. Input from the logged-in user may be returned to the agent 700, for example the agent service 702, for evaluation. Hence, the agent 700, for example the agent service 702, is able to interact with the user with a rich set of customizable messages.

In one example, the custom messaging may include at least one of a confirmation, a challenge-response, and a reason. In more detail, the confirmation may present a dialog which receives a binary yes/no type response, allowing the user to confirm that they do indeed wish to proceed and providing an opportunity to double-check the intended action. The custom messaging conveniently allows specific text, e.g. as set by the policy file 750, to be included in the dialog, such as reminding the user that their request will be logged and audited. As another option, the custom messaging may provide specific block messages, explaining to the user why their request has been blocked, thus enabling improved interaction with the user.

In one example, the custom messaging may require additional authentication to be presented by the logged-in user in order to proceed with the request. As an example, the additional authentication may require the logged-in user to again enter their username and password credentials, or may involve one or more of the many other forms of authentication (e.g. a biometric fingerprint or retinal scan) as will be appreciated by those skilled in the art. The challenge-response also allows alternate forms of authentication to be employed, such as a two-factor authentication. In one example, the challenge-response requires entry of a validation code, which might be provided such as from a second device or an IT helpdesk.

In one example, the reason allows the logged-in user to provide feedback concerning the motivation for their request, e.g. by selecting amongst menu choices or entering free text. Logging the reasons from a large set of users allows the network 10 to be administered more efficiently in future, such as by setting additional rules in the policy file 750 to meet the evolving needs of a large user population.

Notably, custom messaging allows the agent 700, for example the agent service 702, to provide a rich and informative set of interactions with the logged-in users. Each of these individual custom messaging actions may be defined in the policy file 750. The custom messaging may eventually result in a decision to allow or block the requested action. An appropriate allow or block operation is then carried out as required.

Auditing

In one example, the agent 700, for example the agent service 702, is arranged to perform auditing in relation to at least certain requests. The auditing may include recording the customised messaging, if any, and may include recording an outcome of the request. Audit reports may be extracted or uploaded from each computer device 200, for example via a console 21 on the server device 20, as shown in FIG. 1. Each of these auditing functions may be defined in the policy 750.

Method of Managing Privilege Delegation

At S301, the agent 700, in this example the agent driver 720, cooperating with the operating system 202 of the computer device 200, intercepts the request from the user account 210 of the logged-in user on the computer device 200 to create the process 220 according to first privileges in the user account 210 on the computer device 200 and obtains information related to the request.

At S302, the agent 700, in this example the agent service 702, determines whether to create the process 220 in the user account 210 on the computer device 200 according to second privileges different from the first privileges, based at least in part on the obtained information, comprising hooking a query provided by the operating system 202 to identify whether the user account control service 250 cooperating the operating system 202 is enabled, enquiring of the operating system whether to create the process in the user account on the computer device according to the second privileges whereupon the hooked query is invoked and confirming, in response to the invoked hooked query, that the user account control service is enabled.

At S303, the agent 700, in this example the agent service 702 via the agent driver 720, causes the process 220 to be created according to the second privileges in the user account 210 by the operating system 202 on the computer device 200, if it is determined to create the process 220 in the user account 210 on the computer device 200 according to the second privileges.

The shield in FIG. 3 is indicated by a dashed line and includes a check mark (also known as a tick), to indicate that while the user account control service 250 is disabled, the computer device 200 has been spoofed that the user account control service 250 is enabled. The process 220 is indicated by a dashed line to indicate that creation of the process 220 is requested (and subsequently completed).

Figure 4:
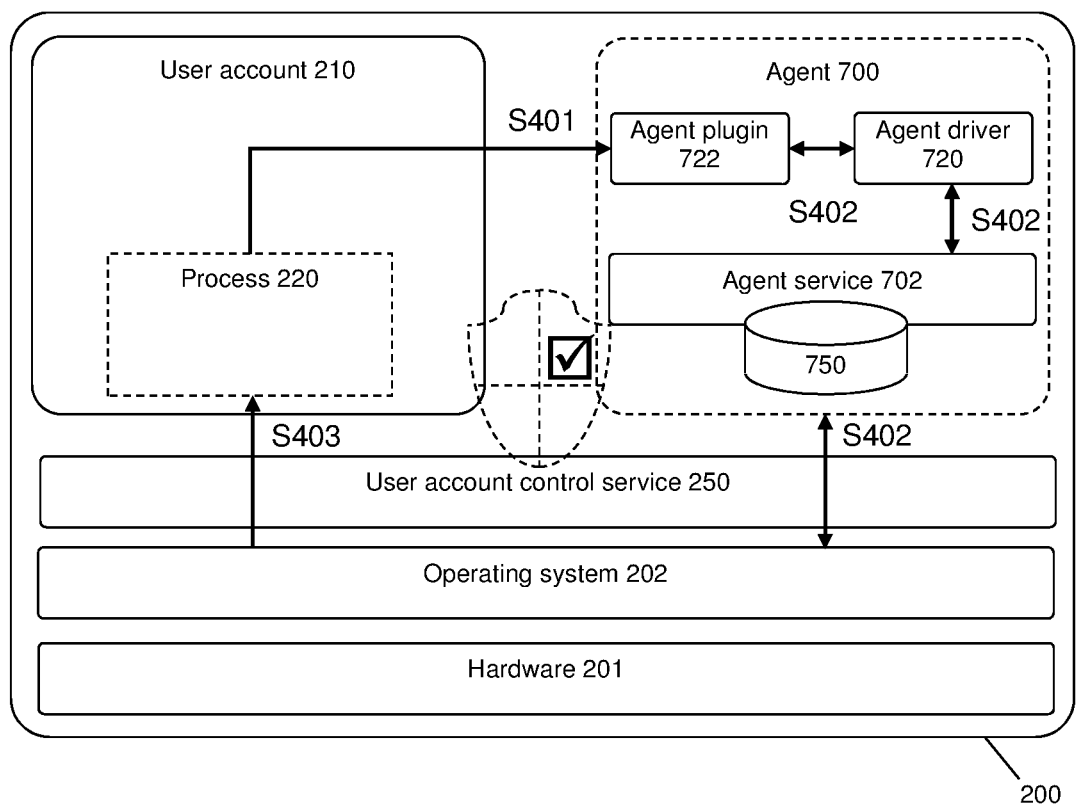
FIG. 4 is a schematic view of the example computer device in more detail.

FIG. 4 is a schematic view of the example computer device 200, in more detail.

In this example, the computer device 200 comprises the agent 700 cooperating with the operating system 202. Particularly, in this example, the agent 700 comprises the agent service 702, the agent driver 720 and an agent plug-in 722, for example a DLL. The agent service 702, the agent driver 720 and the agent plug-in 722 are arranged to function cooperatively. In one example, the agent driver 720 comprises the agent plug-in 722. In one example, the agent plug-in 722 is an extension of the agent driver 720. In one example, the agent plug-in is arranged to perform at least some of the functions performed by the agent driver 720, as described previously. By dividing functions of the agent 700 between the cooperating agent service 702, the agent driver 720 and the agent plug-in 722, the agent service 702 may be better isolated from malicious attacks, thereby improving a security of the computer device 200. Furthermore, by dividing functions of the agent 700 between the cooperating agent service 702, the agent driver 720 and the agent plug-in 722, processing demands may be reduced because a determination of passive handling and/or a result of a previous determination, for example, may be made sooner.

In one example, the agent plug-in 722 is arranged to intercept the request from the user account 210 of the logged-in user on the computer device 200 by hooking the function through which the request is passed, as described previously with respect to the agent driver 720. In one example, the agent plug-in 722 is arranged to obtain information related to the request, as described previously with respect to the agent driver 720. In one example, the agent plug-in 722 is arranged to forward the obtained information to the agent driver 720. In one example, the agent plug-in 722 is arranged to cause the process 220 to be created according to the second privileges in the user account 210 by the operating system 202 on the computer device 200, if it is determined to create the process 220 in the user account 210 on the computer device 200 according to the second privileges, as described previously with respect to the agent driver 720. The agent driver 720 may be arranged otherwise as described previously.

At S401, the agent 700, in this example the agent plug-in 722, cooperating with the operating system 202 of the computer device 200, intercepts the request from the user account 210 of the logged-in user on the computer device 200 to create the process 220 according to first privileges in the user account 210 on the computer device 200 and obtains information related to the request. The agent plug-in 722 forwards the obtained information to the agent driver 720.

At S402, the agent 700, in this example the agent service 702, determines whether to create the process 220 in the user account 210 on the computer device 200 according to second privileges different from the first privileges, based at least in part on the obtained information, comprising hooking a query provided by the operating system 202 to identify whether the user account control service 250 cooperating the operating system 202 is enabled, enquiring of the operating system whether to create the process in the user account on the computer device according to the second privileges whereupon the hooked query is invoked and confirming, in response to the invoked hooked query, that the user account control service is enabled.

At S403, the agent 700, in this example the agent service 702 via the agent driver 720 and/or the agent plug-in 722, causes the process 220 to be created according to the second privileges in the user account 210 by the operating system 202 on the computer device 200, if it is determined to create the process 220 in the user account 210 on the computer device 200 according to the second privileges.

The shield in FIG. 4 is indicated by a dashed line and includes a check mark (also known as a tick), to indicate that while the user account control service 250 is disabled, the computer device 200 has been spoofed that the user account control service 250 is enabled. The process 220 is indicated by a dashed line to indicate that creation of the process 220 is requested (and subsequently completed).

Figure 5:
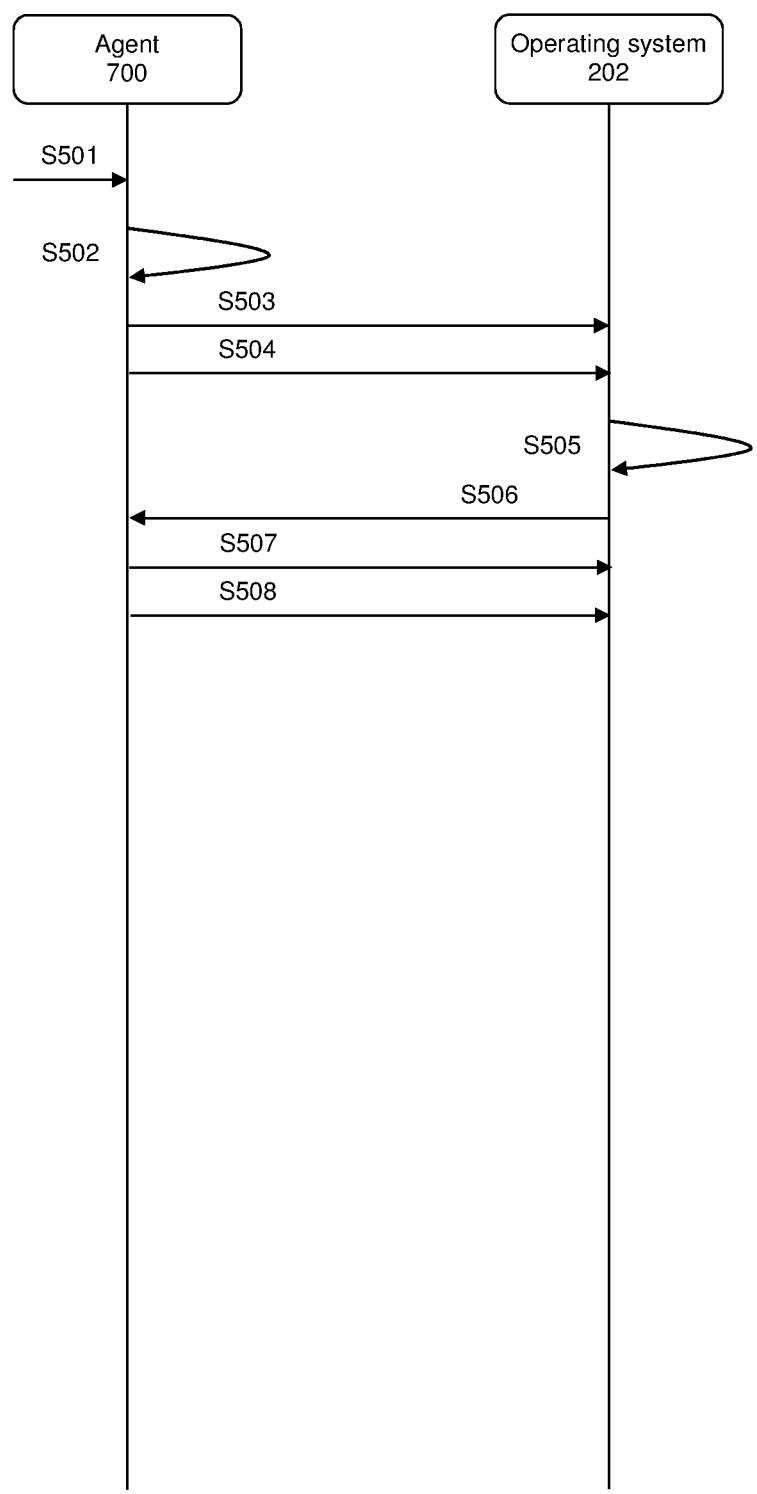
FIG. 5 is a flowchart of an example method of operating the example computer device.

FIG. 5 is a flowchart of an example method of operating the example computer device 200, as described above. The method is of managing privilege delegation to control creation of processes on the computer device 200. This example method may include any of the steps described herein.

At S501, an agent 700 cooperating with an operating system 202 of the computer device 200, intercepts a request from a user account of a logged-in user on the computer device 200 to create a process according to first privileges in the user account 210 on the computer device 200.

Intercepting the request may comprise hooking the request in a user space, an application space and/or a kernel provided by the operating system 202.

At S502, the agent 700 obtains information related to the request.

The agent 700 determines whether to create the process in the user account 210 on the computer device 200 according to second privileges different from the first privileges, based at least in part on the obtained information.

At S503, the agent 700 hooks a query provided by the operating system 202 to identify whether a user account control service 250 cooperating the operating system 202 is enabled.

At S504, the agent 700 enquires of the operating system 202 whether to create the process in the user account 210 on the computer device 200 according to the second privileges whereupon the hooked query is invoked at S505.

In response to the invoked hooked query at S506, the agent 700 confirms at S507 that the user account control service is enabled.

At S508, the agent 700 causes the process to be created according to the second privileges in the user account 210 by the operating system 202 on the computer device 200, if it is determined to create the process in the user account 210 on the computer device 200 according to the second privileges.

Determining, by the agent 700, whether to create the process in the user account 210 on the computer device 200 according to the second privileges different from the first privileges may comprise examining, by the agent 700, the information and referencing, by the agent 700, a policy file 750. Determining, by the agent 700, whether to create the process in the user account 210 on the computer device 200 according to the second privileges different from the first privileges may comprise prompting the logged-in user via the user account 210 for authorisation and receiving the authorisation therefrom.

The method may comprise causing, by the agent 700, the process to be created according to the first privileges in the user account 210 by the operating system 202 on the computer device 200, if it is determined to not create the process in the user account 210 on the computer device 200 according to the second privileges.

Causing, by the agent 700, the process 220 to be created according to the second privileges in the user account 210 by the operating system 202 on the computer device 200 may comprise delegating the second privileges to the process by providing a token, having the second privileges assigned thereto, to the process 220.

The user account control service 750 cooperating the operating system 202 may be disabled.

The first privileges may be associated with a standard user account and the second privileges may be associated with an administrator account.

The method may comprise unhooking, by the agent 700, the hooked query in response to the hooked query being invoked.

Figure 6:
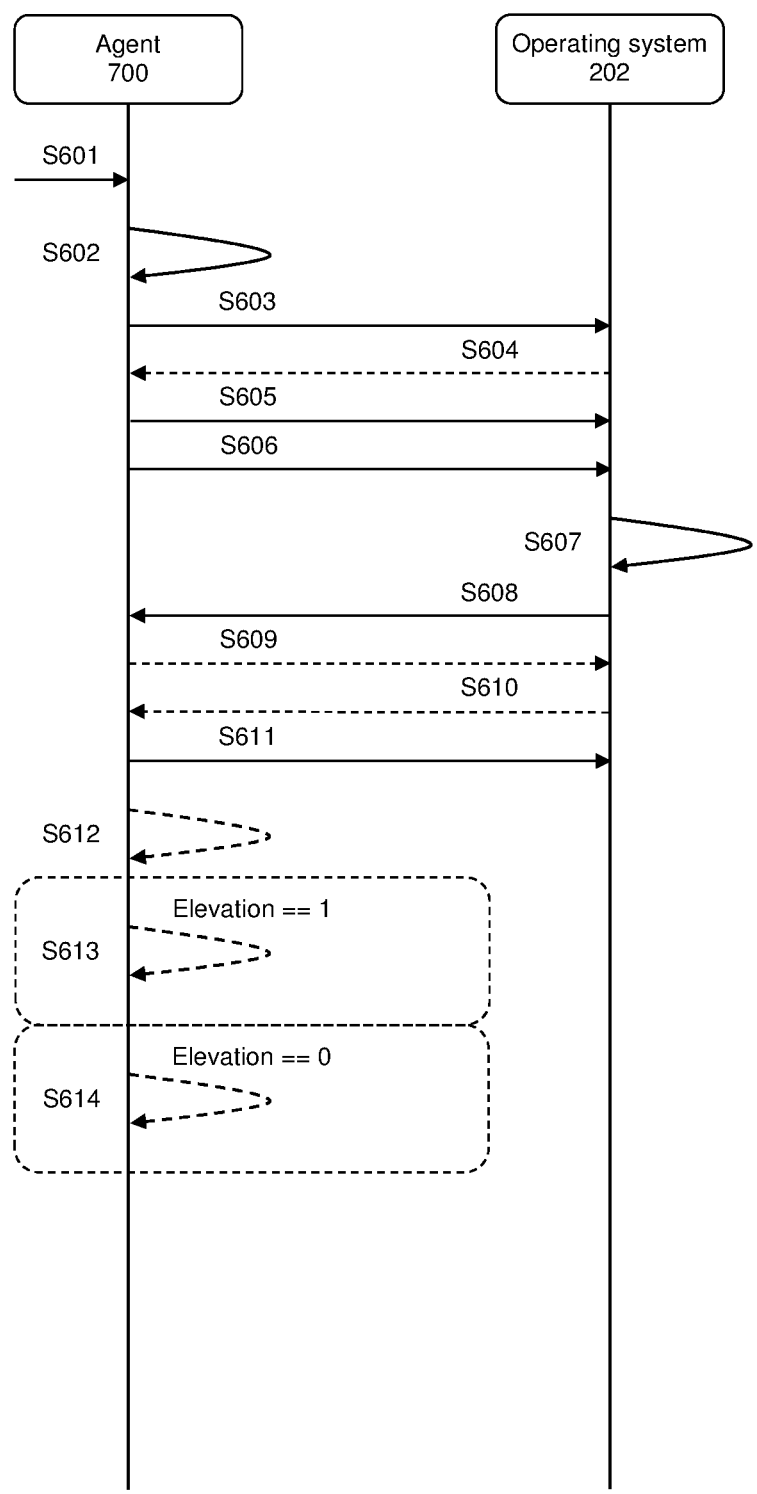
FIG. 6 is a flowchart of an example method of operating the example computer device in more detail.

FIG. 6 is a flowchart of an example method of operating the example computer device 200 in more detail.

At S601, the agent 700 intercepts the request from the user account 210 of a logged-in user on the computer device 200 to create the process 220 according to first privileges in the user account 210 on the computer device 200.

At S602, the agent 700 obtains information related to the request.

At S603, the agent 700 queries the operating system 202 whether the user account control service 250 is enabled.

At S604, the operating system 202 returns a status (status enabled or status disabled, amongst others) to the agent 700, indicating whether the user account control service 250 is enabled.

At S605, the agent 700 hooks a query provided by the operating system 202 to identify whether a user account control service 250 cooperating the operating system 202 is enabled, if the status returned at S604 is status disabled.

At S606, the agent 700 enquires of the operating system 202 whether to create the process 220 in the user account 210 on the computer device 200 according to the second privileges.

At S607, the operating system 202 queries the operating system 202 whether the user account control service 250 is enabled by calling the now hooked query.

In response to the invoked hooked query, the operating system 202 confirms at S608 that the user account control service 250 is enabled i.e. a spoofed status enabled rather than a true status of status disabled.

At S609, the agent 700 forwards the spoofed status enabled to the operating system 202.

At S610, the operating system 202 returns the response to the enquiry of S606 as whether to create the process 220 in the user account 210 on the computer device 200 according to the second privileges.

At S611, the agent 700 unhooks the hooked query, if the status returned at S604 is status disabled (i.e. the user account control service 250 is disabled).

At S612, the agent 700 examines the response, received at S610, to the enquiry of S606 as whether to create the process 220 in the user account 210 on the computer device 200 according to the second privileges to the agent driver 720.

At S613, the agent 700 causes the process 220 to be created according to the second privileges in the user account 210 by the operating system 202 on the computer device 200, if it is determined to create the process in the user account 210 on the computer device 200 according to the second privileges (i.e. elevation is required).

At S614, the agent 700 causes the process 220 to be created according to the first privileges in the user account 210 by the operating system 202 on the computer device 200, if it is determined to create the process in the user account 210 on the computer device 200 according to the first privileges (i.e. elevation is not required).

Figure 7:
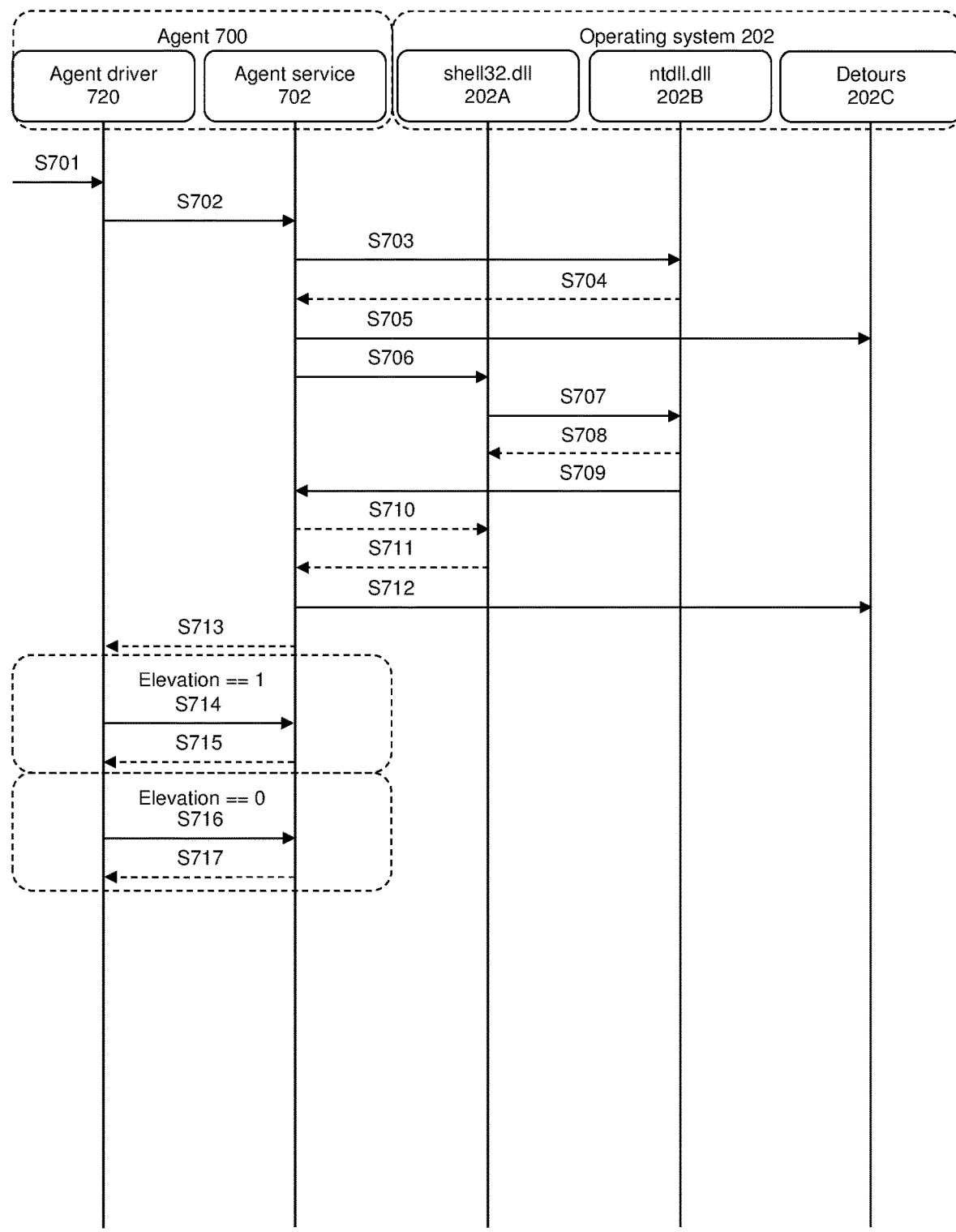
FIG. 7 is a flowchart of an example method of operating the example computer device in more detail

FIG. 7 is a flowchart of an example method of operating the example computer device 200 in more detail on a MICROSOFT WINDOWS operating system 202. Particularly, the agent 700 comprises the agent driver 720 and the agent service 702, as described previously. Particularly, the MICROSOFT WINDOWS operating system 202 comprises three software components: shell32.dll 202A, ntdll.dll 202B and Detours 202C. shell32.dll 202A is a library which includes WINDOWS Shell API functions. ntdll.dll 202B is a library which includes NT kernel functions. Detours 202C is a library for instrumenting Win32 functions. Detours 202C intercepts Win32 functions by re-writing in-memory code for target functions. The Detours 202C package also contains utilities to attach DLLs and data segments (called payloads) to Win32 binaries.

At S701, the agent driver 720 intercepts the request from the user account 210 of a logged-in user on the computer device 200 to create the process 220 according to first privileges in the user account 210 on the computer device 200.

At S702, the agent driver 720 obtains information related to the request and forwards a message including the information, requesting whether elevation is required, to the agent service 702.

At S703, the agent service 702 queries the operating system 202, specifically ntdll.dll 202B, whether the user account control service 250 is enabled by calling a function RtlQueryElevationFlags.

At S704, ntdll.dll 202B returns a status (status enabled or status disabled, amongst others) to the agent service 702, indicating whether the user account control service 250 is enabled.

At S705, the agent service 702 hooks a query provided by the operating system 202 to identify whether a user account control service 250 cooperating the operating system 202 is enabled, if the status returned by ntdll.dll 202B is status disabled. Specifically, the agent 702 hooks the query in Detours 202C, provided by the operating system 202, by calling a function DetourAttach(&(PVOID&)TrueRtlQueryElevationFlags, MyRtlQueryElevationFlags), if the status returned by ntdll.dll 202B is status disabled.

At S706, the agent 700 enquires of the operating system 202, specifically shell32.dll 202A, whether to create the process 220 in the user account 210 on the computer device 200 according to the second privileges, by calling a function IsElevationRequired(Path), where Path is the path of the process 220.

At S707, the operating system 202, specifically Shell32.dll 202A, queries the operating system 202, specifically ntdll.dll 202B, whether the user account control service 250 is enabled by calling the now hooked function RtlQueryElevationFlags.

In response to the invoked hooked query, the operating system 202, specifically ntdll.dll 202B, confirms at S708 that the user account control service 250 is enabled i.e. a spoofed status enabled rather than a true status of status disabled.

At S709, the operating system 202, specifically ntdll.dll 202B, returns to the agent service 702.

At S710, the agent service 702 forwards the (spoofed) status enabled to the operating system 202, specifically Shell32.dll 202A.

At S711, the operating system 202, specifically Shell32.dll 202A, returns the response to the enquiry of S706 as whether to create the process 220 in the user account 210 on the computer device 200 according to the second privileges, as the return to the called function IsElevationRequired(Path), where Path is the path of the process 220.

At S712, the agent service 702 unhooks the hooked query by calling a function DetourDetach(&(PVOID&) TrueRtlQueryElevationFlags, MyRtlQueryElevationFlags), if the status returned by ntdll.dll 202B is status disabled (i.e. the user account control service 250 is disabled).

At S713, the agent service 702 returns the response, received at S711, to the enquiry of S706 as whether to create the process 220 in the user account 210 on the computer device 200 according to the second privileges to the agent driver 720.

At S714, the agent driver 720 requests the agent service 702 to cause the process 220 to be created according to the second privileges in the user account 210 by the operating system 202 on the computer device 200, if it is determined to create the process in the user account 210 on the computer device 200 according to the second privileges (i.e. elevation is required). At S715, the agent service 702 acknowledges this request to the agent driver 720.

At S716, the agent driver 720 requests the agent service 702 to causes the process 220 to be created according to the first privileges in the user account 210 by the operating system 202 on the computer device 200, if it is determined to create the process in the user account 210 on the computer device 200 according to the first privileges (i.e. elevation is not required). At S715, the agent service 702 acknowledges this request to the agent driver 720.

Figure 8:
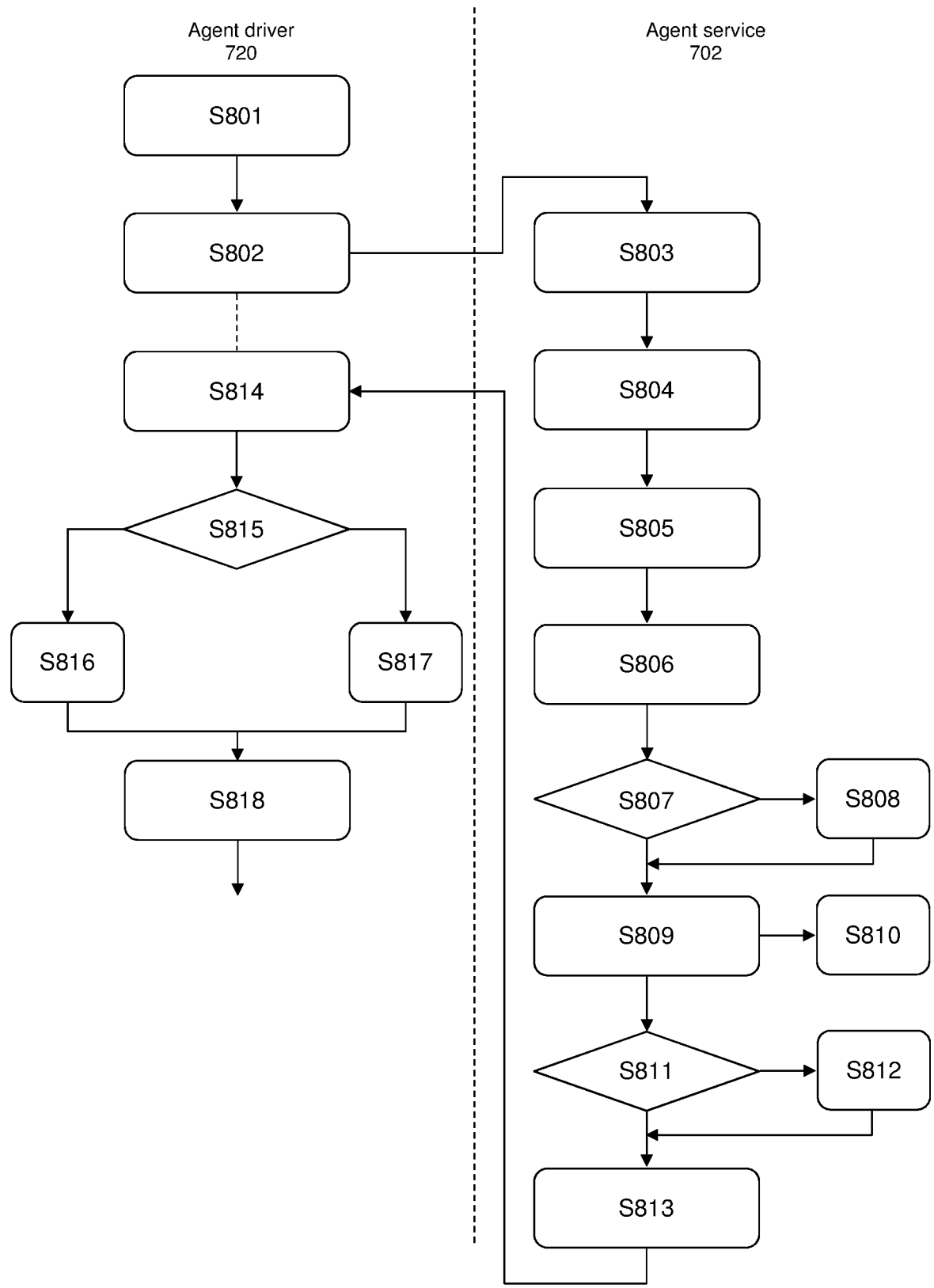
FIG. 8 is a flowchart of an example method of operating the example computer device in more detail.

FIG. 8 is a flowchart of an example method of operating the example computer device 200 in more detail.

At S801, the agent driver 720 intercepts the request from the user account 210 of the logged-in user on the computer device 200 to create the process 220 according to first privileges in the user account 210 on the computer device 200.

At S802, the agent driver 720 obtains information, including an access token, related to the request and forwards message including the information, requesting whether elevation is required, to the agent service 702.

At S803, the agent service 702 receives the message from the agent driver 720 and resolves the message.

At S804, the agent service 702 determines whether elevation is required.

At S805, the agent service 702 impersonates and modifies the access token forwarded by the agent driver 720.

At S806, the agent service 702 queries the operating system 202, specifically ntdll.dll 202B, whether the user account control service 250 is enabled by calling the function RtlQueryElevationFlags. ntdll.dll 202B returns a status (status enabled or status disabled, amongst others) to the agent service 702, indicating whether the user account control service 250 is enabled.

At S807, the agent service 702 hooks a query provided by the operating system 202 to identify whether a user account control service 250 cooperating the operating system 202 is enabled, if the status returned by ntdll.dll 202B is status disabled. Specifically, the agent 702 hooks the query in Detours 202C, provided by the operating system 202, by calling a function DetourAttach(&(PVOID&)TrueRtlQueryElevationFlags, MyRtlQueryElevationFlags), if the status returned by ntdll.dll 202B is status disabled.

At S808, this query in Detours 202C is hooked and control returns to the agent service 702.

At S809, the agent 700 enquires of the operating system 202, specifically shell32.dll 202A, whether to create the process 220 in the user account 210 on the computer device 200 according to the second privileges, by calling a function IsElevationRequired(Path), where Path is the path of the process 220.

At S810, the operating system 202, specifically Shell32.dll 202A, queries the operating system 202, specifically ntdll.dll 202B, whether the user account control service 250 is enabled by calling the now hooked function RtlQueryElevationFlags.

In response to the invoked hooked query, the operating system 202, specifically ntdll.dll 202B, confirms that the user account control service 250 is enabled i.e. a spoofed status enabled rather than a true status of status disabled. The operating system 202, specifically Shell32.dll 202A, returns the response to the enquiry of S806 as whether to create the process 220 in the user account 210 on the computer device 200 according to the second privileges, as the return to the called function IsElevationRequired(Path), where Path is the path of the process 220.

At S811, the agent service 702 unhooks the hooked query by calling a function DetourDetach(&(PVOID&)TrueRtlQueryElevationFlags, MyRtlQueryElevationFlags), if the status returned by ntdll.dll 202B is status disabled (i.e. the user account control service 250 is disabled).

At S812, this query in Detours 202C is unhooked and control returns to the agent service 702.

At S813, the agent service 702 returns the response, received at S803, to the enquiry of S802 as whether to create the process 220 in the user account 210 on the computer device 200 according to the second privileges to the agent driver 720.

At S814, the agent driver 720 receives the response from the agent service 702.

At S815, the agent driver 720 examines the response of whether to create the process 220 in the user account 210 on the computer device 200 according to the second privileges.

At S816, the agent driver 720 causes the process 220 to be created according to the first privileges in the user account 210 by the operating system 202 on the computer device 200, if it is determined to not create the process 220 in the user account 210 on the computer device 200 according to the second privileges (i.e. elevation is not required).

At S817, the agent driver 720, via the agent service 702, causes the process 220 to be created according to the second privileges in the user account 210 by the operating system 202 on the computer device 200, if it is determined to create the process 220 in the user account 210 on the computer device 200 according to the second privileges (i.e. elevation is required).

At S817, the agent driver 720 handles creation or otherwise of the process.

Figure 9:
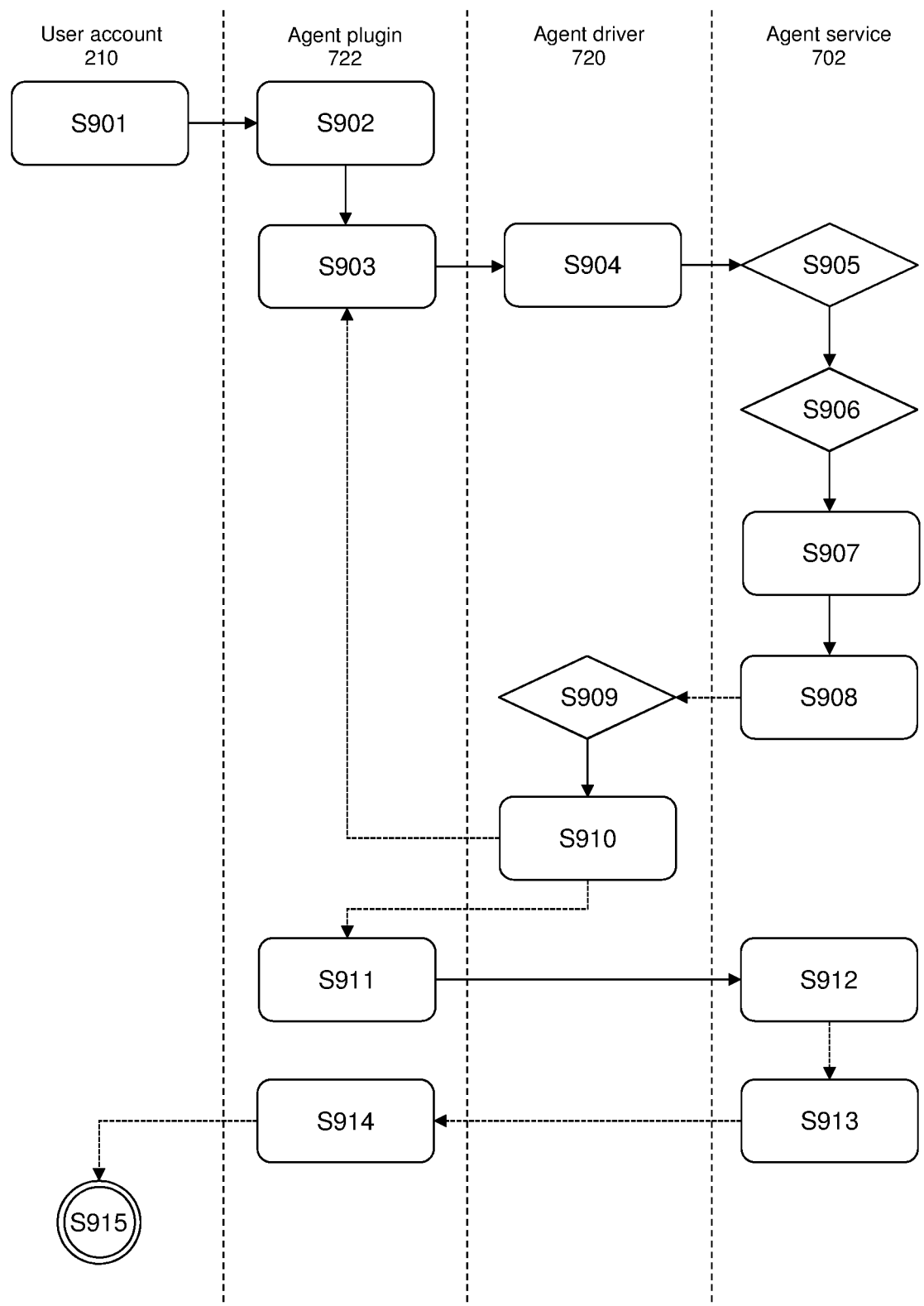
FIG. 9 is a flowchart of part of an example method of operating the example computer device in more detail.

FIG. 9 is a flowchart of part of an example method of operating the example computer device 200 in more detail.

At S901, the request from the user account 210 of the logged-in user on the computer device 200 is made to create the process 220 according to first privileges in the user account 210 on the computer device 200, for example by double-clicking a corresponding application.

At S902, the agent plug-in 722 intercepts the request from the user account 210 of the logged-in user on the computer device 200 to create the process 220 according to first privileges in the user account 210 on the computer device 200, by hooking the request.

At S903, the agent plug-in 722 obtains information, including an access token, related to the request and forwards the message including the information, requesting whether elevation is required, to the agent driver 720.

At S904, the agent driver 720 checks whether an identifier of the process 220 is cached and whether the process 220 is blocked. If an identifier of the process 220 is cached, control continues at S911. Otherwise, the agent driver 720 forwards the message including the information, requesting whether elevation is required, to the agent service 702.

At S905, the agent service 702 receives the message from the agent driver 720 and determines whether elevation is required according to a type of the process 220. For example, elevation may not be required for DLLs but may be required for executables.

At S906, the agent service 702 determines whether Zone ID tracking for the process 220 is required.

At S907, the agent service 702 determines whether elevation is required, as described previously.

At S908, the agent service 702 prompts the logged-in user via the user account for authorisation and receives the authorisation therefrom.

At S909, control returns to the agent driver 720 which determines whether the process 220 should be blocked (i.e. not created).

At S910, the identifier of the process 220 is cached together with whether or not the process should be blocked.

At S911, the agent plug-in 722 requests the agent service 702 to cause the process 220 to be created according to the second privileges in the user account 210 by the operating system 202 on the computer device 200, if it is determined to create the process 220 in the user account 210 on the computer device 200 according to the second privileges (i.e. elevation is required), as described previously.

At S912, the agent service 702 causes the process 220 to be created according to the second privileges in the user account 210 by the operating system 202 on the computer device 200, if it is determined to create the process 220 in the user account 210 on the computer device 200 according to the second privileges (i.e. elevation is required), as described previously.

At S913, the agent service 702 performs auditing in relation to the request and returns control to the agent plug-in 722.

At S914, the agent plug-in 722 returns from the hooked request to the user account 210.

At S915, control is returned to the user account 210.

In summary, a computer device for managing privilege delegation to control creation of processes thereon is described. A method and a CRM are also described. Creation of a process, in a user account on the computer device, is requested according to first privileges. An agent, cooperating with an operating system of the computer device, intercepts the request. The agent determines whether to create the process according to second privileges, different from the first privileges and if permitted, cause the process to be created accordingly. The agent hooks a query provided by the operating system to identify whether a user account control service is enabled. The agent enquires of the operating system whether to create the process according to the second privileges whereupon the hooked query is invoked. In response to the invoked hooked query, the agent confirms to the operating system that the user account control service is enabled, such that checks by the operating system are performed as if the operating system were enabled.

As will now be appreciated from the discussion herein, the example method, the computer device and the system (e.g. the network) have many benefits and advantages. In particular, creation of processes on the computer device is managed more securely and with more refined granularity, while enhancing the user experience. Advantageously, the least-privilege access security model is maintained even if a user account control service is disabled. A logged-in user may be assigned relatively low level privileges on the computer device. Required privileges associated with a requested process creation are temporarily and selectively enhanced by the agent, suitably with per process and/or per user granularity. Thus, processes which need a higher privilege level may still be created on the computer device, without assigning relatively higher privileges to user accounts. Furthermore, specific privileges may be associated with each requested process and/or each user, providing more granular control of the computer device than provided for conventionally.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processor circuits. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" may mean including the component(s) specified but is not intended to exclude the presence of other components.

Although a few example embodiments have been shown and described, it will be appreciated by those skilled in the art that various changes and modifications might be made without departing from the scope of the invention, as defined in the appended claims.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A computer device for managing privilege delegation to control creation of processes thereon, the computer device comprising:
a processing circuit;
a memory;
an operating system;
a user account control service cooperating with the operating system; and
an agent cooperating with the operating system; wherein the agent is arranged to:
intercept a request from a user account of a logged-in user on the computer device to create a process according to first privileges in the user account on the computer device and to obtain information related to the request;

determine whether to create the process in the user account on the computer device according to second privileges different from the first privileges, based at least in part on the obtained information, by:
hooking a query provided by the operating system, wherein the hooked query is configured to identify whether the user account control service cooperating the operating system is enabled,
enquiring of the operating system whether to create the process in the user account on the computer device according to the second privileges, and
confirming, by invoking the hooked query and in response to the enquiring of the operating system, that the user account control service is enabled; and
cause the process to be created according to the second privileges in the user account by the operating system on the computer device, if it is determined to create the process in the user account on the computer device according to the second privileges.

2. The computer device according to claim 1, wherein the agent is arranged to intercept the request by hooking the request in a user space, an application space and/or a kernel provided by the operating system.

3. The computer device according to claim 1, wherein the agent is arranged to determine whether to create the process in the user account on the computer device according to the second privileges different from the first privileges by examining the information and referencing a policy file.

4. The computer device according to claim 1, wherein the agent is arranged to determine whether to create the process in the user account on the computer device according to the second privileges different from the first privileges by prompting the logged-in user via the user account for authorisation and receiving the authorisation therefrom.

5. The computer device according to claim 1, wherein the agent is arranged to cause the process to be created according to the first privileges in the user account by the operating system on the computer device, if it is determined to not create the process in the user account on the computer device according to the second privileges.

6. The computer device according to claim 1, wherein the agent is arranged to cause the process to be created according to the second privileges in the user account by the operating system on the computer device by delegating the second privileges to the process by providing a token, having the second privileges assigned thereto, to the process.

7. The computer device according to claim 1, wherein the user account control service cooperating the operating system is disabled.

8. The computer device according to claim 1, wherein the first privileges are associated with a standard user account and wherein the second privileges are associated with an administrator account.

9. The computer device according to claim 1, wherein the user account is an administrator account.

10. The computer device according to claim 1, wherein the agent is arranged to unhook the hooked query in response to the hooked query being invoked.

11. A method of managing privilege delegation to control creation of processes on a computer device, the method being implemented by hardware of the computer device including at least a processor and a memory, the method comprising:
intercepting, by an agent cooperating with an operating system of the computer device, a request from a user account of a logged-in user on the computer device to create a process according to first privileges in the user account on the computer device and obtaining information related to the request;
determining, by the agent, whether to create the process in the user account on the computer device according to second privileges different from the first privileges, based at least in part on the obtained information, comprising:
hooking a query provided by the operating system, the hooked query configured to identify whether a user account control service cooperating the operating system is enabled,
enquiring of the operating system whether to create the process in the user account on the computer device according to the second privileges, and
confirming, by invoking the hooked query and in response to the enquiring of the operating system, that the user account control service is enabled; and
causing, by the agent, the process to be created according to the second privileges in the user account by the operating system on the computer device, if it is determined to create the process in the user account on the computer device according to the second privileges.

12. The method according to claim 11, wherein intercepting the request comprises hooking the request in a user space, an application space and/or a kernel provided by the operating system.

13. The method according to claim 11, wherein determining, by the agent, whether to create the process in the user account on the computer device according to the second privileges different from the first privileges comprises examining, by the agent, the information and referencing, by the agent, a policy file.

14. The method according to claim 11, wherein determining, by the agent, whether to create the process in the user account on the computer device according to the second privileges different from the first privileges comprises prompting the logged-in user via the user account for authorisation and receiving the authorisation therefrom.

15. The method according to claim 11, comprising causing, by the agent, the process to be created according to the first privileges in the user account by the operating system on the computer device, if it is determined to not create the process in the user account on the computer device according to the second privileges.

16. The method according to claim 11, wherein causing, by the agent, the process to be created according to the second privileges in the user account by the operating system on the computer device comprises delegating the second privileges to the process by providing a token, having the second privileges assigned thereto, to the process.

17. The method according to claim 11, wherein the user account control service cooperating the operating system is disabled.

18. The method according to claim 11, wherein the first privileges are associated with a standard user account and wherein the second privileges are associated with an administrator account.

19. The method according to claim 11, comprising unhooking, by the agent, the hooked query in response to the hooked query being invoked.

20. A tangible non-transitory computer-readable storage medium having recorded thereon instructions which, when implemented by hardware of a computer device including at least a processor and a memory, cause the computer device to:

intercept, by an agent cooperating with an operating system of the computer device, a request from a user account of a logged-in user on the computer device to create a process according to first privileges in the user account on the computer device and obtaining information related to the request;

determine, by the agent, whether to create the process in the user account on the computer device according to second privileges different from the first privileges, based at least in part on the obtained information, comprising:

hooking a query provided by the operating system, wherein the hooked query is configured to identify whether a user account control service cooperating the operating system is enabled, enquiring of the operating system whether to create the process in the user account on the computer device according to the second privileges, and confirming, by invoking the hooked query and in response to the enquiring of the operating system, that the user account control service is enabled; and cause, by the agent, the process to be created according to the second privileges in the user account by the operating system on the computer device, if it is determined to create the process in the user account on the computer device according to the second privileges.

\* \* \* \* \*